US011688305B2

(12) United States Patent
Utz et al.

(10) Patent No.: US 11,688,305 B2
(45) Date of Patent: Jun. 27, 2023

(54) LABEL SHEET ASSEMBLY WITH SURFACE FEATURES

(71) Applicant: CCL Label, Inc., Framingham, MA (US)

(72) Inventors: Martin Utz, Bavaria (DE); Alan Jameson, West Covina, CA (US); Eric Cushing, Riverside, CA (US); Le-Hoa Hong, Brea, CA (US); Sriram Venkatasanthanam, Chino Hills, CA (US); Adam Bratter, Newport Coast, CA (US); Heba Armand, Placentia, CA (US); Ana Trinh, Rowland Heights, CA (US); Thomas Amann, Buchloe/Lindenberg (DE); Martin Bögl, Warngau (DE); Andreas Meyer, Ottobrunn (DE); Rebekka Trabitzsch, Putzbrunn (DE)

(73) Assignee: CCL Label, Inc., Framingham, MA (US)

( * ) Notice: Subject to any disclaimer, the term of this patent is extended or adjusted under 35 U.S.C. 154(b) by 0 days.

(21) Appl. No.: 17/360,259

(22) Filed: Jun. 28, 2021

(65) Prior Publication Data
US 2021/0327309 A1 Oct. 21, 2021

Related U.S. Application Data

(63) Continuation of application No. 15/813,693, filed on Nov. 15, 2017, now Pat. No. 11,049,420.
(Continued)

(51) Int. Cl.
G09F 3/02 (2006.01)
G09F 3/00 (2006.01)
(Continued)

(52) U.S. Cl.
CPC ............... *G09F 3/02* (2013.01); *C09J 7/403* (2018.01); *G09F 3/0297* (2013.01); *G09F 3/10* (2013.01);
(Continued)

(58) Field of Classification Search
CPC . G09F 3/02; G09F 3/0297; G09F 3/10; G09F 2003/0201; G09F 2003/0226;
(Continued)

(56) References Cited

U.S. PATENT DOCUMENTS 4,459,344 A * 7/1984 Jacob .................. G03G 9/0926
430/124.13
6,001,209 A 12/1999 Popat et al.
(Continued)

FOREIGN PATENT DOCUMENTS

JP H0729569 U * 6/1995

OTHER PUBLICATIONS

Machine Translation of JP H0729569 U. (Year: 1995).*

*Primary Examiner* — Patricia L. Nordmeyer
(74) *Attorney, Agent, or Firm* — McDonald Hopkins LLC

(57) ABSTRACT

A label sheet assembly and method is disclosed for improving the process of feeding label sheets through a printer. The label sheet assembly may include a facestock layer and a liner sheet. The facestock layer may include an adhesive layer along at least a portion of a first side and include a label surface along at least a portion of the second side opposite the adhesive layer. The liner sheet layer may include at least one surface feature provided along a back side of the liner sheet. In another embodiment, the facestock layer may include at least one surface feature provided along the front of the facestock layer. The surface features may create a
(Continued)

zone of increased friction or increase tactile sensitivity along the various surfaces of the label sheet assembly to improve printer processing.

16 Claims, 51 Drawing Sheets

Related U.S. Application Data

(60) Provisional application No. 62/475,288, filed on Mar. 23, 2017, provisional application No. 62/422,364, filed on Nov. 15, 2016.

(51) Int. Cl.
*C09J 7/40* (2018.01)
*G09F 3/10* (2006.01)

(52) U.S. Cl.
CPC ............... *G09F 2003/0201* (2013.01); *G09F 2003/0226* (2013.01); *G09F 2003/0264* (2013.01); *G09F 2003/0267* (2013.01); *Y10T 428/14* (2015.01)

(58) Field of Classification Search
CPC ...... G09F 2003/0264; G09F 2003/0267; C09J 7/403; Y10T 428/14
See application file for complete search history.

(56) References Cited

U.S. PATENT DOCUMENTS

| | | |
|---|---|---|
| 2010/0080946 A1 | 4/2010 | Hodson et al. |
| 2010/0293829 A1 | 11/2010 | Miles et al. |
| 2014/0106132 A1* | 4/2014 | Hong .................. B41M 5/00 428/177 |

* cited by examiner

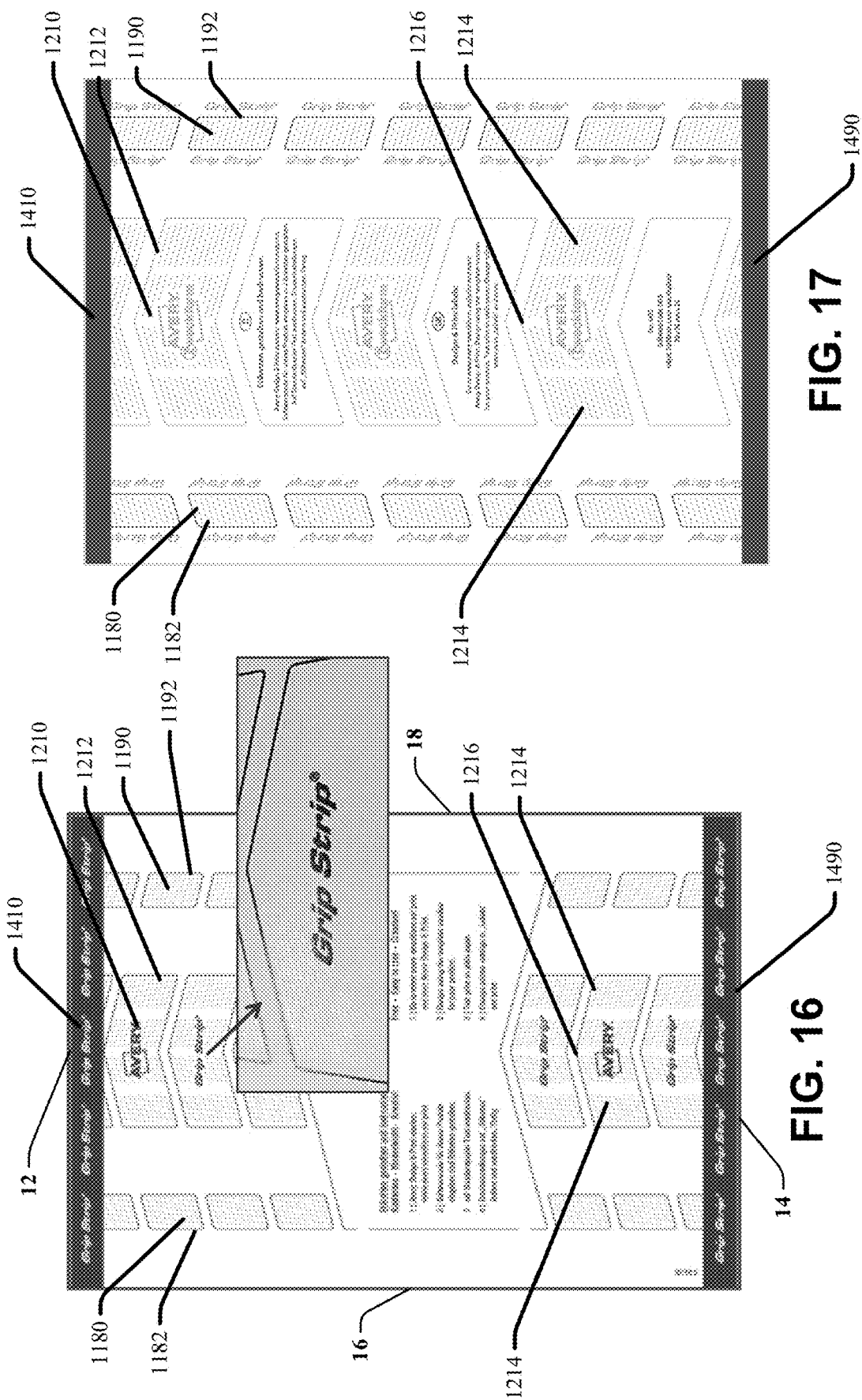

LABEL SHEET ASSEMBLY WITH SURFACE FEATURES

CROSS-REFERENCES TO RELATED APPLICATIONS

The present application is a continuation of U.S. Utility application Ser. No. 15/813,693, titled "LABEL SHEET FEED EDGE ASSEMBLY," filed Nov. 15, 2017 which claims priority to and the benefit of U.S. Provisional Application No. 62/422,364, titled "LABEL SHEET FEED EDGE ASSEMBLY," filed Nov. 15, 2016, and U.S. Provisional Application No. 62/475,288, titled "LABEL SHEET ASSEMBLY WITH SURFACE FEATURES," filed Mar. 23, 2017 which are hereby incorporated by reference in their entirety.

FIELD OF INVENTION

The present disclosure generally relates to a label sheet assembly and method of making a label sheet assembly that is configured to be processed through a printer to print indicia thereon. More particularly, the disclosure relates to a label sheet assembly with surface features that is configured to improve printer processing.

BACKGROUND

Labels and label sheets are well known and various types have been proposed to meet the requirements of a wide variety of label applications. For example, labels are extensively used in retail businesses for communicating product information to customers. Labels generally include a facestock layer with an adhesive side and an exposed side. The exposed side includes a surface for receiving label indicia thereon and is opposite from the adhesive side. A liner sheet is operably attached to the adhesive side and is configured to allow a user to peel the label portion of the facestock from the liner sheet to be placed on a substrate. A plurality of cut lines may separate the facestock layer into a plurality of labels in various arrangements.

Many label sheets are configured to be fed through a printer to print ink on the surface of the labels. For example, U.S. Pat. No. 7,709,071 to Wong et al. discloses a particular type of label sheet assembly that is configured to be fed through a printer and also allows a user to easily remove labels by hand. This patent is incorporated herein by reference in its entirety. These label sheet assemblies allow a user broad discretion as to the orientation of the label and the indicia to be printed thereon. However, problems arise when a user processes label sheets through a printer, such as an inkjet printer, desktop printer, or laser printer. Many printers are configured to receive a label sheet or other sheet and process it through at least one, but usually more than one, rotary mechanisms during the printing process. These processes may cause portions of the label sheet assembly to become creased, manipulated or otherwise disengaged. This may cause ink to shift or labels to be moved relative the remaining facestock layer or liner sheet. Labels risk damage and indicia may not be accurately printed along the labels.

Therefore, there is a need for a label sheet assembly having a facestock and liner material that can be configured to reduce inconsistent processing through a printer. There is also a need for an improved method of feeding a label sheet through a printer to accurately apply ink or indicia thereon without unduly manipulating the orientation of the labels or label sheet assembly.

SUMMARY

The present system leverages the advantages of a label sheet assembly with surface features. Provided are embodiments of a label sheet assembly that include a facestock layer having first and second sides, the facestock layer including at least one cut line that defines at least one label and a matrix portion on the first side wherein the facestock layer is configured to receive indicia thereon. An adhesive layer along the second side and a liner sheet layer having top and bottom surfaces, the top surface attached to the adhesive layer along the facestock layer. At least one surface feature is provided along the bottom surface of the liner sheet layer, wherein the at least one surface feature may provide a zone of increased tactile sensitivity along the label sheet assembly. Further, the surface feature may also provide a zone of increased friction thereon. A first surface feature may be applied along a header portion of the first side of the facestock layer. A second surface feature may be applied along a footer portion opposite of the first side of the facestock layer along an opposite edge of the first surface feature. The at least one surface feature may be a printed texture or an embossed texture. The at least one surface feature may includes alignment features wherein the alignment features include at least one of a diagonal line and a straight line.

The at least one surface feature may be a first vertical surface feature provided along the bottom surface of the liner sheet layer and include a second and third vertical surface feature. The first and second vertical surface features may include a plurality of spaced areas with rounded outer edges. The third vertical surface feature may includes a plurality of spaced areas having a generally arrow shape with rounded edges and may be generally aligned with the plurality of spaced areas of the first and second vertical surface features.

In another embodiment provided is a label sheet assembly that includes a facestock layer having at least one cut line that defines at least one label and a matrix portion wherein the facestock layer is configured to receive indicia thereon. The label sheet assembly includes an adhesive layer and a liner sheet layer. A first surface feature may be applied along a header portion of the matrix portion wherein the first surface feature may provide a zone of increased tactile sensitivity along the label sheet assembly. Further, the surface feature may provide a zone of increased friction thereon. A second surface feature may be positioned along a footer portion opposite from the first surface feature. The first surface feature may be a printed texture or an embossed texture. The liner sheet layer may include a bottom surface opposite the facestock layer wherein a first surface feature may be positioned along a header portion of the bottom surface and a second surface feature may be positioned along a footer portion of the bottom surface. The first surface feature along the bottom surface may be aligned with the first surface feature positioned along the matrix portion. The first surface feature and the second surface feature may include a solid color with contrasting indicia. The solid color may include at least one of Blue (PMS 286), Red (PMS 185), Green (PMS 368), and Gray (PMS Warm Gray 5). In one embodiment, the label sheet assembly may include a bottom side opposite from the facestock layer, the bottom side may include at least one of a first surface feature, a second surface feature, a solid color header, and a solid color footer. The bottom side may include a header portion and a footer portion with a solid color that is different from the header portion and the footer portion of the facestock layer.

The contracting indicia may include alignment features wherein the alignment features include at least one of a diagonal line and a straight line.

Specific reference is made to the appended claims, drawings, and description below, all of which disclose elements of the invention. While specific embodiments are identified, it will be understood that elements from one described aspect may be combined with those from a separately identified aspect as combinations of the described features can be exchanged and/or replaced with the other disclosed features herein. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the disclosure may be better understood by reference to the following detailed description taken in connection with the following illustrations, wherein:

FIGS. 16, 17, and 18 are plan views of embodiments of a back of the label sheet assembly in accordance with the present disclosure;

DETAILED DESCRIPTION

Reference will now be made in detail to embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A label sheet assembly 10 is disclosed and may be of any appropriate configuration and is not limited to that shown and described herein. It should similarly be understood that the sheet assembly 10 may be adapted to any appropriate size, including, without limitation, 8.5 inches by 11 inches, A4 size, legal size or any other size, including, without limitation smaller sizes. The sheet assembly 10 may be made of any appropriate materials and colors or indicia and this disclosure is not limited in this regard.

Figure 1:
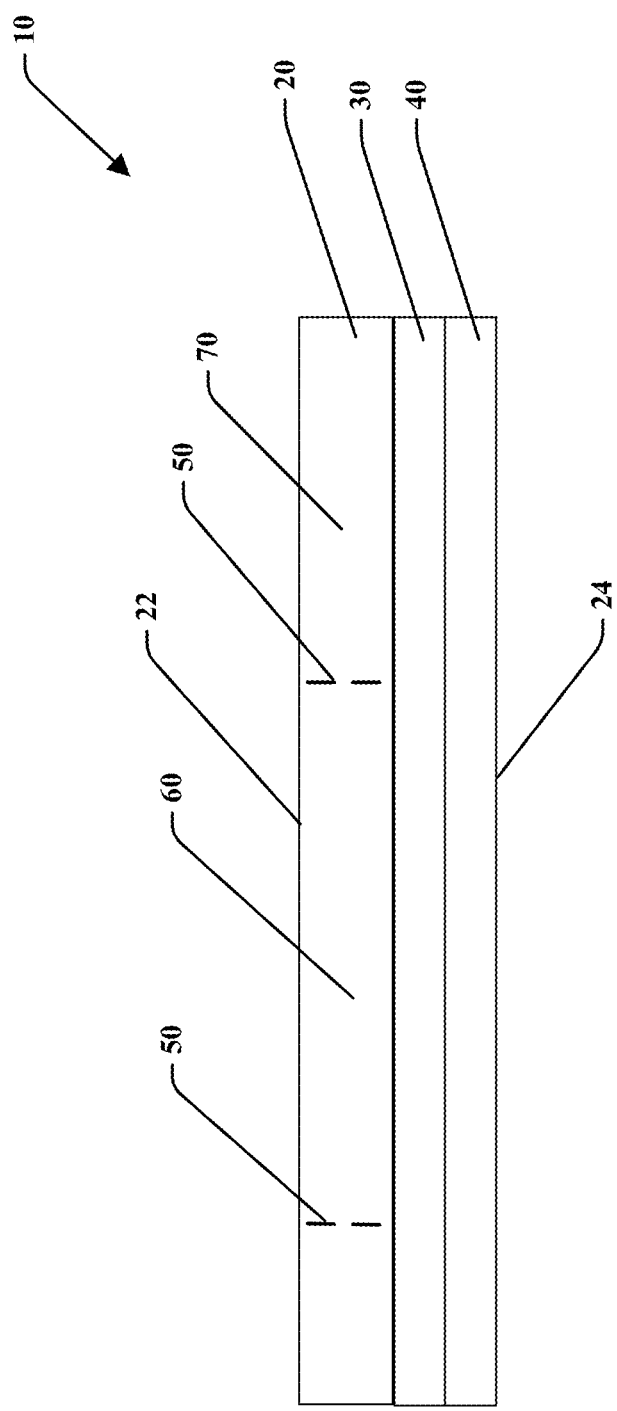
FIG. 1 is a cross sectional view of an embodiment of a label sheet assembly of the present disclosure.

FIG. 1 is a cross sectional side view of the sheet assembly 10 that may include a facestock layer 20 that may be coated with a pressure sensitive adhesive layer 30. Sheet assembly 10 may also include a liner sheet 40 attached to the adhesive layer 30. The liner sheet 40 may include a release coating for supporting the adhesive layer 30. The liner sheet 40 may be made of any appropriate material, including, without limitation a calendared paper or polymer film. The facestock layer 20 may be of any appropriate material, including without limitation a paper, plastic or polymer material such as a polyester material or other transparent, translucent or semi-translucent material. The facestock layer 20 may also be a laminate or a label or combination of both. The facestock layer may have a top surface 22 that is configured to receive indicia thereon.

Figure 2:
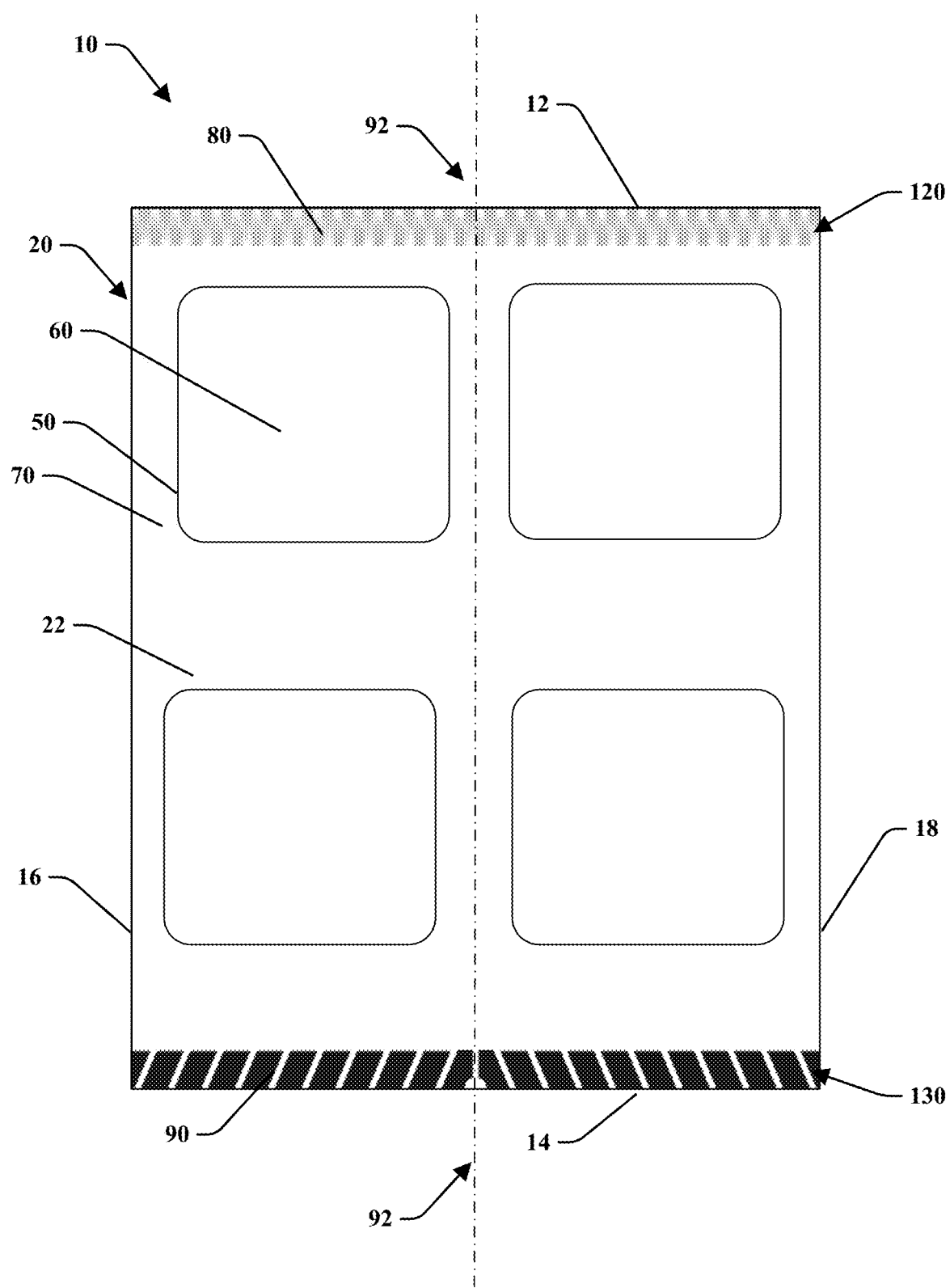
FIG. 2 is a plan view of an embodiment of a label sheet assembly of the present disclosure with a first and a second surface feature.

As illustrated by FIG. 2, the top surface 22 of facestock layer 20 of the sheet assembly 10 is shown in plan view. The sheet assembly 10 may include at least one cut line 50 that may extend through the facestock layer 20 to separate that sheet assembly into labels 60 and a matrix portion 70. In this embodiment, the facestock layer 20 includes six (4) labels 60 having a generally rectangular shape with rounded corners. However, this application is not limited as to the configuration, amount, or size of the labels 60. The present labels 60 are disclosed for the sake of brevity, but the teachings herein apply to any number of labels and any size and shape of labels.

The label sheet assembly 10 may include a first edge 12 and opposite second edge 14 along with a third edge 16 and opposite fourth edge 18. These edges 12, 14, 16, 18 may intersect to form a generally rectangular sheet assembly wherein the label sheet assembly 10 may be configured to be fed into a conventional printer (such as by way of a non-limiting example an ink jet and/or laser printer) from any edge.

The label sheet assembly 10 may include various surface features in different arrangements and made from various materials. In one embodiment, as illustrated by FIG. 2, a first surface feature 80 may be positioned along the matrix portion 70. The first surface feature 80 may extend along the first edge 12 from the third edge 16 to the fourth edge 18 as illustrated. This location may be referred to as the header portion 120. Further, there may be a second surface feature 90 positioned along the matrix portion 70. The second surface feature 90 may be positioned along an opposite side of the label sheet assembly 10 as the first surface feature 80 and may extend along the second edge 14 between the third edge 16 and the fourth edge 18. This location may be referred to as the footer portion 130. In this embodiment, the first and second edges 12, 14 may be shorter in length that the third and fourth edges 16, 18. Further, the first surface feature 80 may have a different configuration than the second surface feature 90 and the various embodiments of the surface features 80, 90 may include a combination of surface elements. The combination may be optimized for traction, friction, tactile sensitivity and flexibility to improve printer processing, ease of handling the sheets by the user, and visual aesthetics. Further, the surface features 80, 90 may be a zone of increased flexibility imparted by coating or embossing to improve printer processing. Printing processing issues may be improved to reduce the skewing of printed indicia during printing through a printer device and reduce the occurrence of having multiple sheets fed through the printer at once, leading to jam.

As such, known label sheet assemblies may have experienced difficulty being fed through printers thereby causing indicia to be applied "off-register" or out of alignment with the intended position along the indicia receiving portions of the labels 60. This off-registration may be due, in part, to the level of friction between a leading edge of the label sheet and the receiving area of the printer device.

In one embodiment, the surface features 80 are added to improve the way in which label sheet assemblies 10 are fed through printers to receive indicia on the labels. The first and second surface features 80, 90 may be provided to improve the accuracy of indicia application while undergoing stresses caused by processing the label sheet assembly 10 though the printer. The first and second surface features 80, 90 may have various orientations that improve frictional abutment with the printer. Additionally, the surface features 80, 90 are flexible enough to allow the printer device to individually index the label sheet assemblies 10 as they are positioned in a stacked orientation relative to one another and being processed by the printer.

Figure 3:
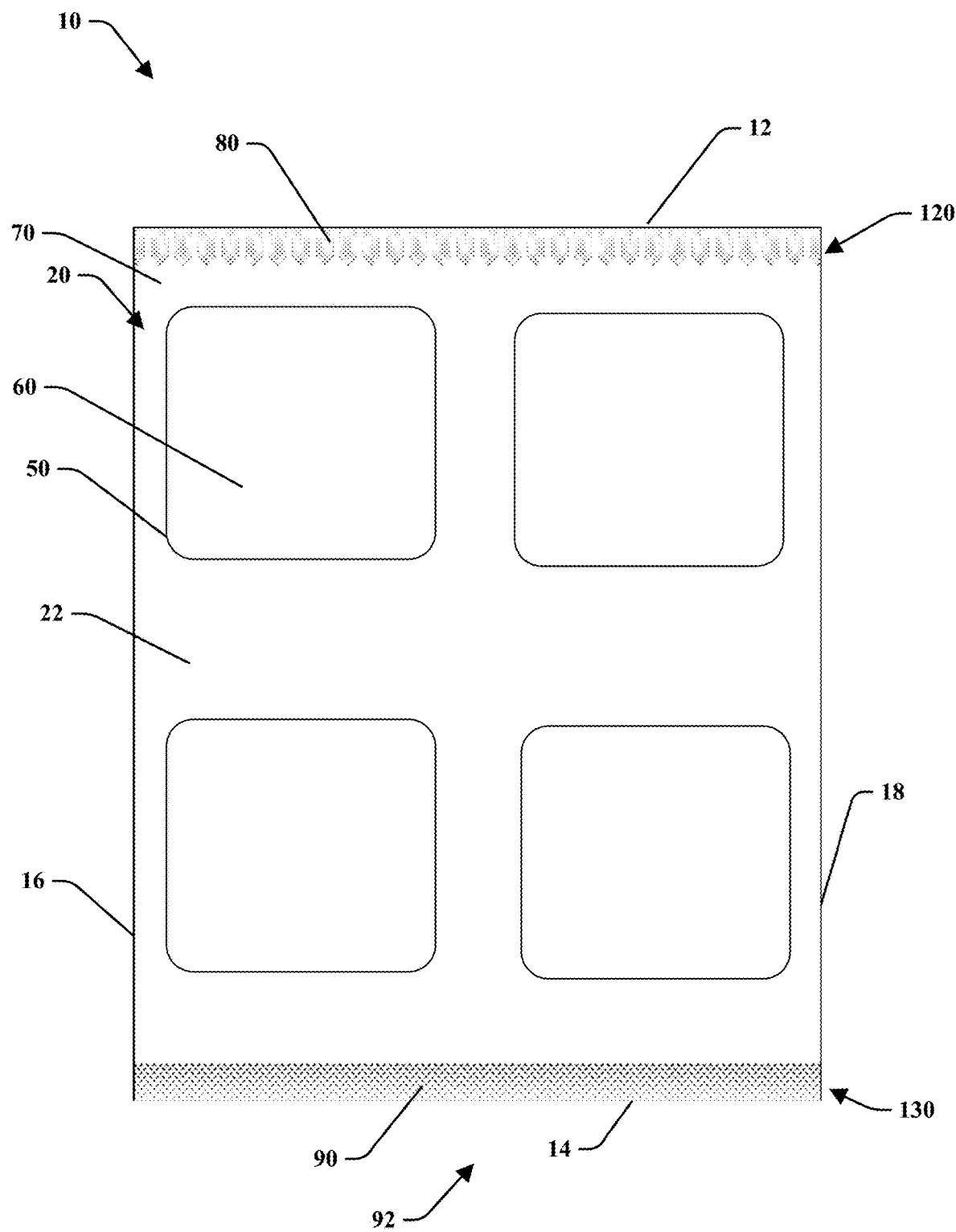
FIG. 3 is a plan view of an embodiment of the label sheet assembly in accordance with one aspect of the present disclosure.
Figure 4:
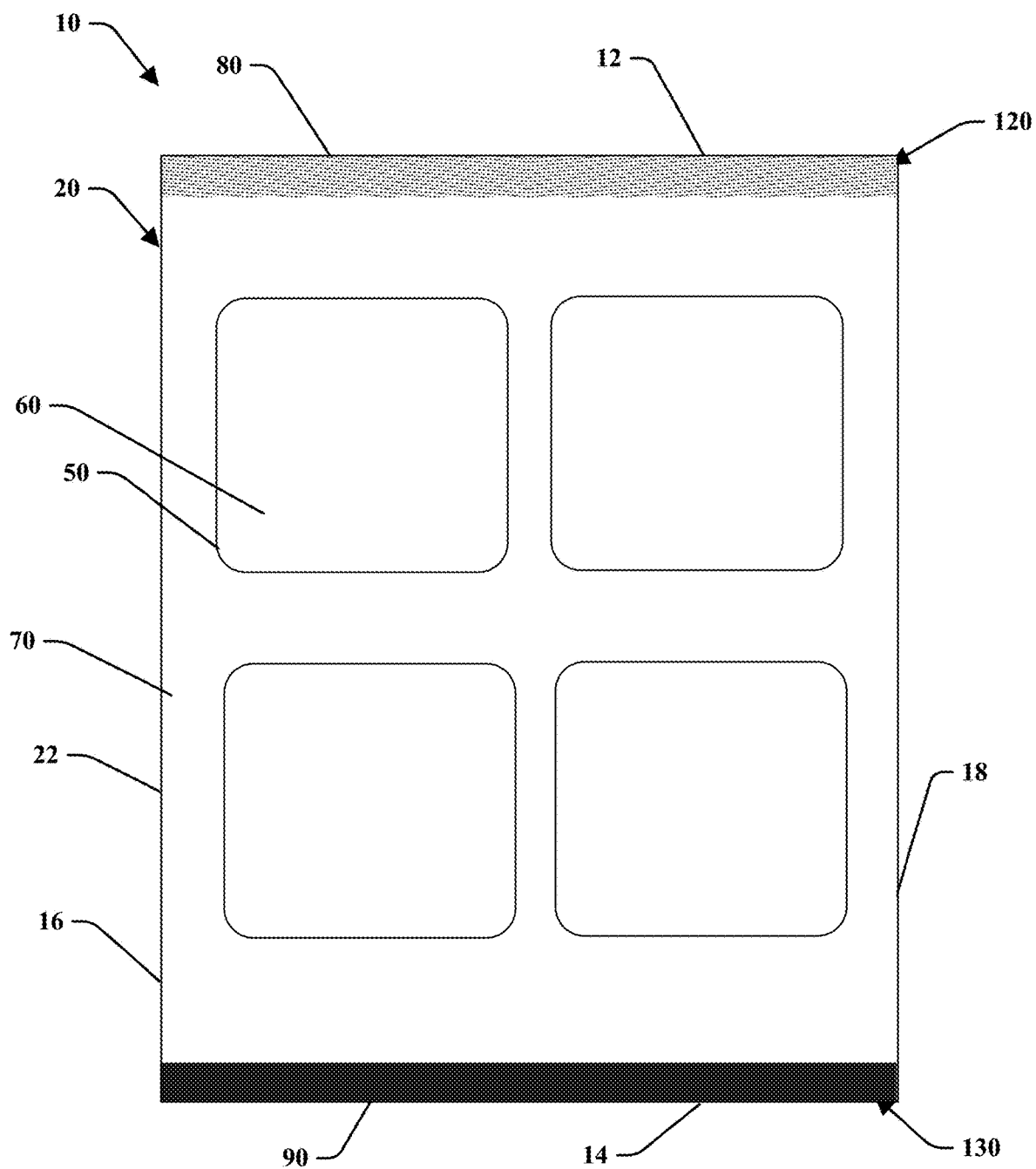
FIG. 4 is a plan view of an embodiment of the label sheet assembly in accordance with an embodiment of the present disclosure.

This application includes surface features 80, 90 having various embodiments. As illustrated by FIGS. 2-4, the first and second surface features 80, 90 may be a printed texture applied to the surface 22 of the matrix 70 along the header or footer portions 120, 130 of the label sheet assembly 10. The printed texture surface feature may be utilized with label sheet assemblies 10 that are made from materials that include an already slippery surface such as a glossy material. The printed texture surface feature may be a material, such as an ink, matt ink, varnish, adhesive, or coating, which is applied along the surface 22 with various orientations. In one embodiment, the material may be made from ink that is applied in a desired pattern by a metering system to place a particular volume of ink material at a desired raised pattern from the surface 22 of the label sheet assembly 10. The ink material may be cured, such as with an ultraviolet (UV) light, to produce a generally raised surface feature in a desired pattern. The printed texture surface feature may also be made from a variety of colors that may be applied to the label sheet assembly to form the surface features as described. Further, the printed texture may be imparted by utilizing a water-based coating or a hot melt material. The coating may be a texture coating such as a sandy, soft touch, or reticulation that yields texture from additives or a specific coating formulation.

In one example, a pattern of the printed texture type of the surface feature may include a randomization pattern as illustrated by the first surface feature 80 of FIG. 2. The randomization pattern may include a plurality of dots or shapes positioned along the header 120 or footer 130 in a random position. In this embodiment, the positon of the printed texture of a subsequently stacked label sheet assembly would be different such that the randomization pattern may assist to prevent nesting of label sheet assemblies 10 when processed from a stacked orientation.

In another embodiment, the pattern of the printed texture includes an angled orientation as illustrated by the second surface feature 90 of FIG. 2. The angled pattern may include a plurality of shapes angled relative to the leading edge of the label sheet. In this embodiment, the shapes extend from the leading edge 14 and are tapered towards a center line 92 of the label sheet assembly. The angled pattern may assist to improved traction with the printer.

In another embodiment, the pattern of the printed texture includes an intensity variation pattern as illustrated by the first and second surface features 80, 90 of FIG. 3. The intensity variation pattern may vary the raised size of the printed texture relative to its distance from the leading edge 12, 14. Further, this pattern may incorporate various features from other patterns such as the randomization pattern or the angled pattern as described above. The intensity variation pattern may improve on the initial traction with the printer to improve processing accuracy.

In another embodiment, the pattern of the printed texture includes a grip strip pattern as illustrated by the first surface feature 80 of FIG. 4. The grip strip pattern may be a plurality of thinly shaped elongated lines positioned along the header portion 120 along the leading edge 12. In another embodiment, the pattern of the printed texture includes a solid bar pattern as illustrated by the second surface feature 90 of FIG. 4. Notably, any type of pattern may be utilized along the header 120 or footer 130 portions of the label sheet assembly and this disclosure in not limited to the pattern or quantity of surface features utilized in a label sheet assembly 10. Notably, the printed texture embodiment may also be accompanied with various indicia and color schemes along the header and footer portions.

Figure 8:
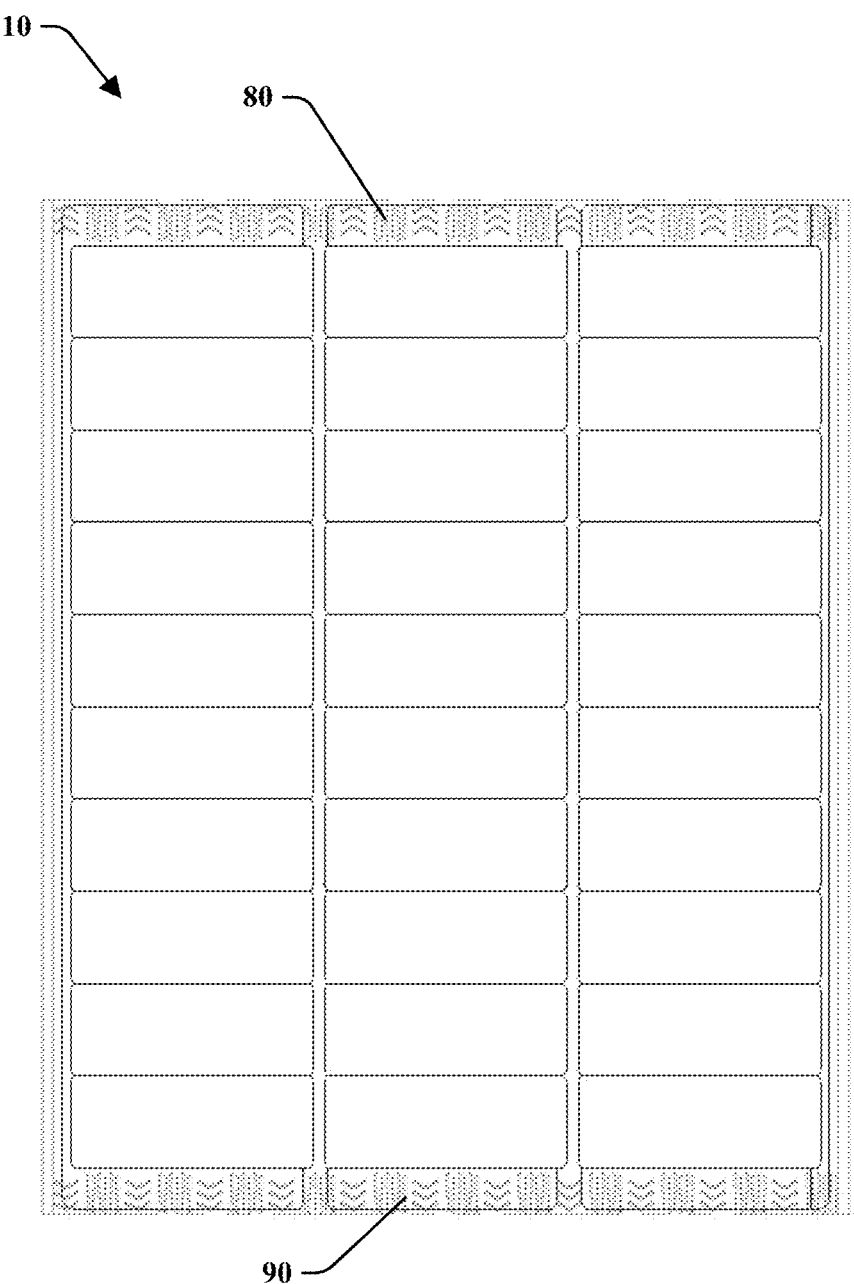
FIG. 8 is a plan view of an embodiment of the label sheet assembly in accordance with an embodiment of the present disclosure.
Figure 9:
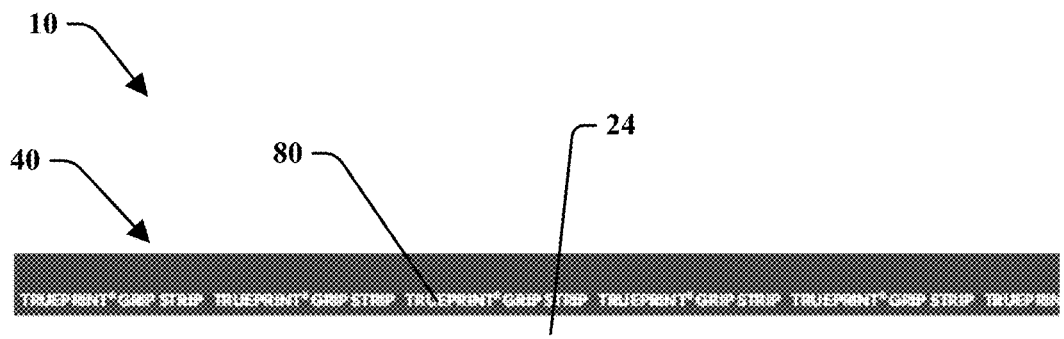
FIG. 9 is a plan view of an embodiment of a back of the label sheet assembly in accordance with an embodiment of the present disclosure.
Figure 10:
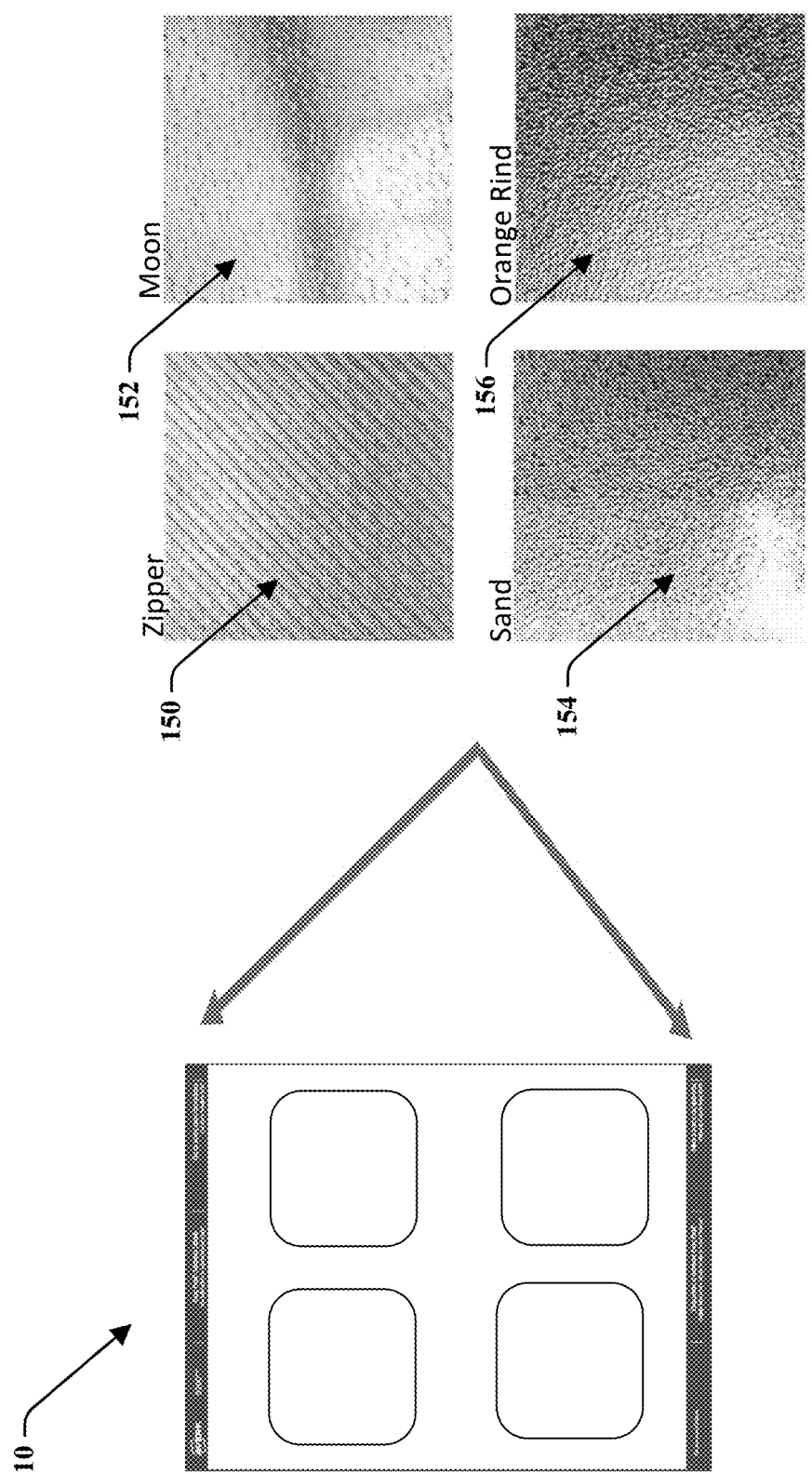
FIG. 10 is a plan view and schematic view of embodiments of the first and second surface features of the label sheet assembly in accordance with the present disclosure.

In other embodiments, as illustrated by FIGS. 5-10, the first and second surface features 80, 90 may be an embossed texture applied to the surface 22 of the matrix 70 along the header or footer portions 120, 130 of the label sheet assembly 10. The embossed texture may include a plurality of micro-cuts or impressions along the surface to cause portions to be raised therefrom. The embossed texture surface feature may also be utilized with label sheet assemblies 10 that are made from contrasting colors from the remaining portion of the label sheet assembly 10. The embossed texture surface feature may be provided along the feed edges to provide tactile perspective to a user and also to improve feeding characteristics when processing the label sheet through a printer. As illustrated by FIG. 10, various configurations of embossed texture may be provided. In particular, the first and second surface features may have a zipper embossed pattern 150, a moon embossed pattern 152, a sand embossed pattern, or an orange rind embossed pattern 156. These embossed patterns are for example and various other embossed patterns may be utilized along the header or footer portions 120, 130 to be utilized as the first or second surface features 80, 90. In one embodiment, the embossed features may be accompanied by a contrasting color provided along the header or footer portions 120, 130. In one embodiment, the contrasting color is a solid blue while the remaining color of the label sheet assembly 10 is white.

Figure 5:
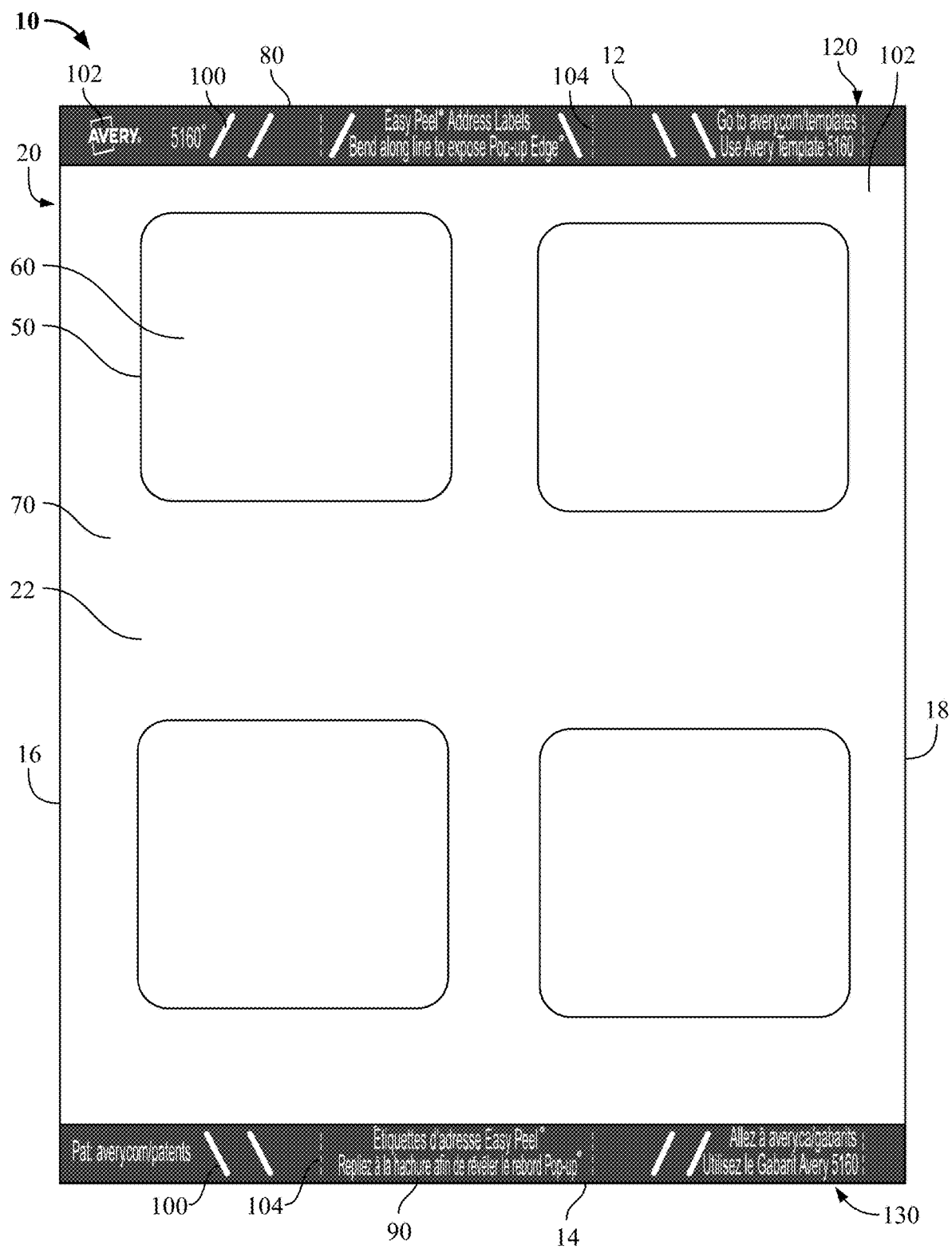
FIG. 5 is a plan view of an embodiment of the label sheet assembly in accordance with an embodiment of the present disclosure.

FIG. 5 illustrates the header portion 120 including various indicia printed thereon in addition to the embossed features and contrasting color. The indicia may indicate the brand mark 102 or associate website of the label sheet assembly 10 along with alignment features 100. The alignment features 100 may visually assist a user to align the label sheet assembly 10 with a printer to be processed therein. The brand mark 102 may indicate to a user a website representative of a type of template associated with the label sheet assembly 10. The website may allow a user to easily incorporate the appropriate template associated with a word processor program to process and align text or other indicia with the indicia receiving portions of the labels 60. In this embodiment, the alignment features 100 include markings with diagonal lines relative to the leading edges 12, 14. These diagonal line type alignment features 100 may also indicate that the particular label sheet assembly 10 includes a plurality of discontinuous cut lines (not shown) as disclosed in commonly owned U.S. patent application Ser. No. 15/331,988 filed Oct. 24, 2016 which is incorporated herein in its entirety. The diagonal line alignment features 100 may include a similar angle relative to the leading edges 12, 14 as the discontinuous cut lines. A straight alignment feature 104 may also be present. The straight line may be continuous or broken lines that may be generally perpendicular to leading edges 12, 14. These straight line alignment features 104 may be aligned with a column of labels or a weakened separation line (not shown) as disclosed by the label sheet assemblies of U.S. Pat. No. 7,709,071 to Wong et al. These weakened separation lines allow a user to easily remove labels by hand.

Figure 6:
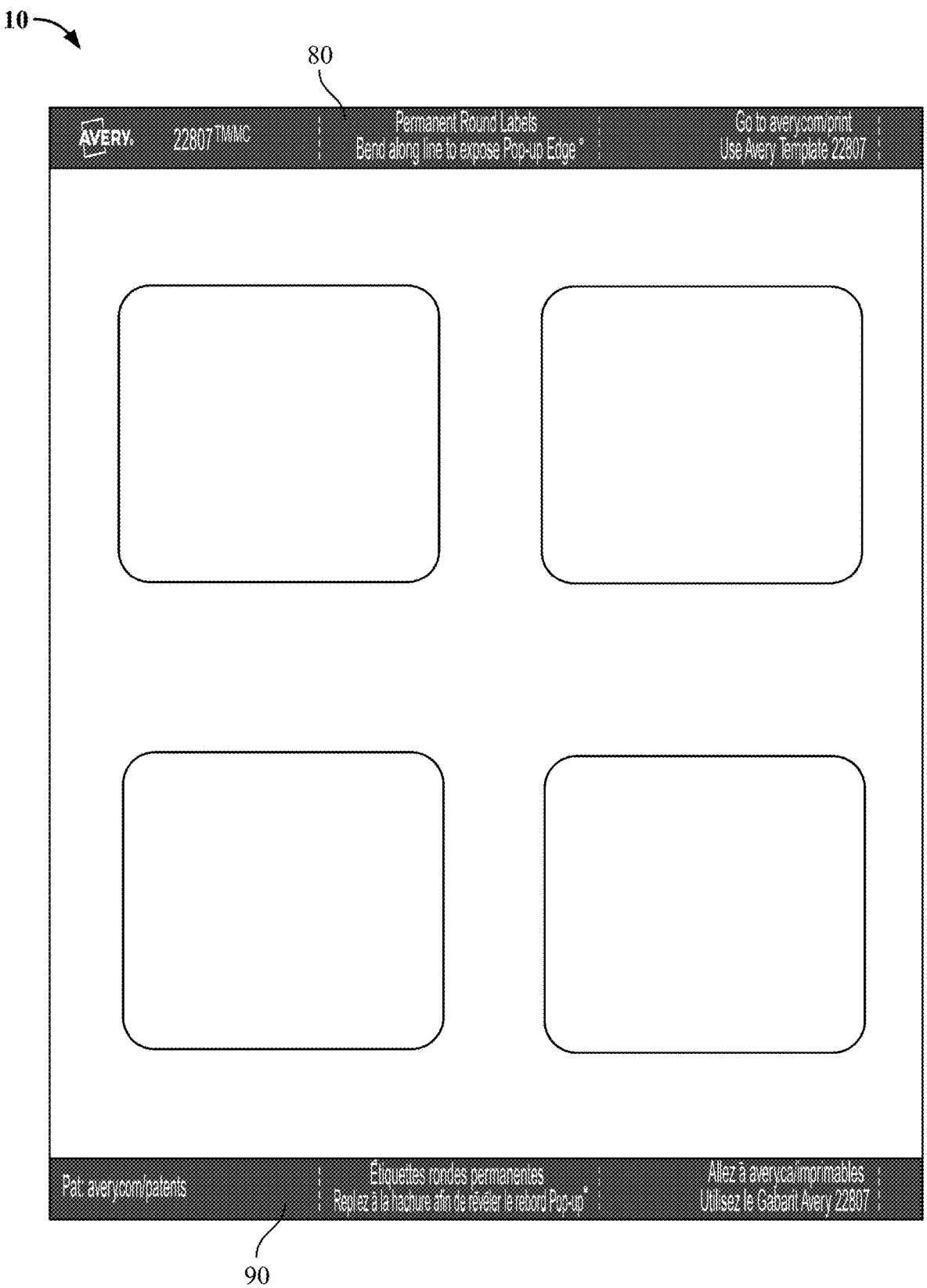
FIG. 6 is a plan view of an embodiment of the label sheet assembly in accordance with an embodiment of the present disclosure.
Figure 7:
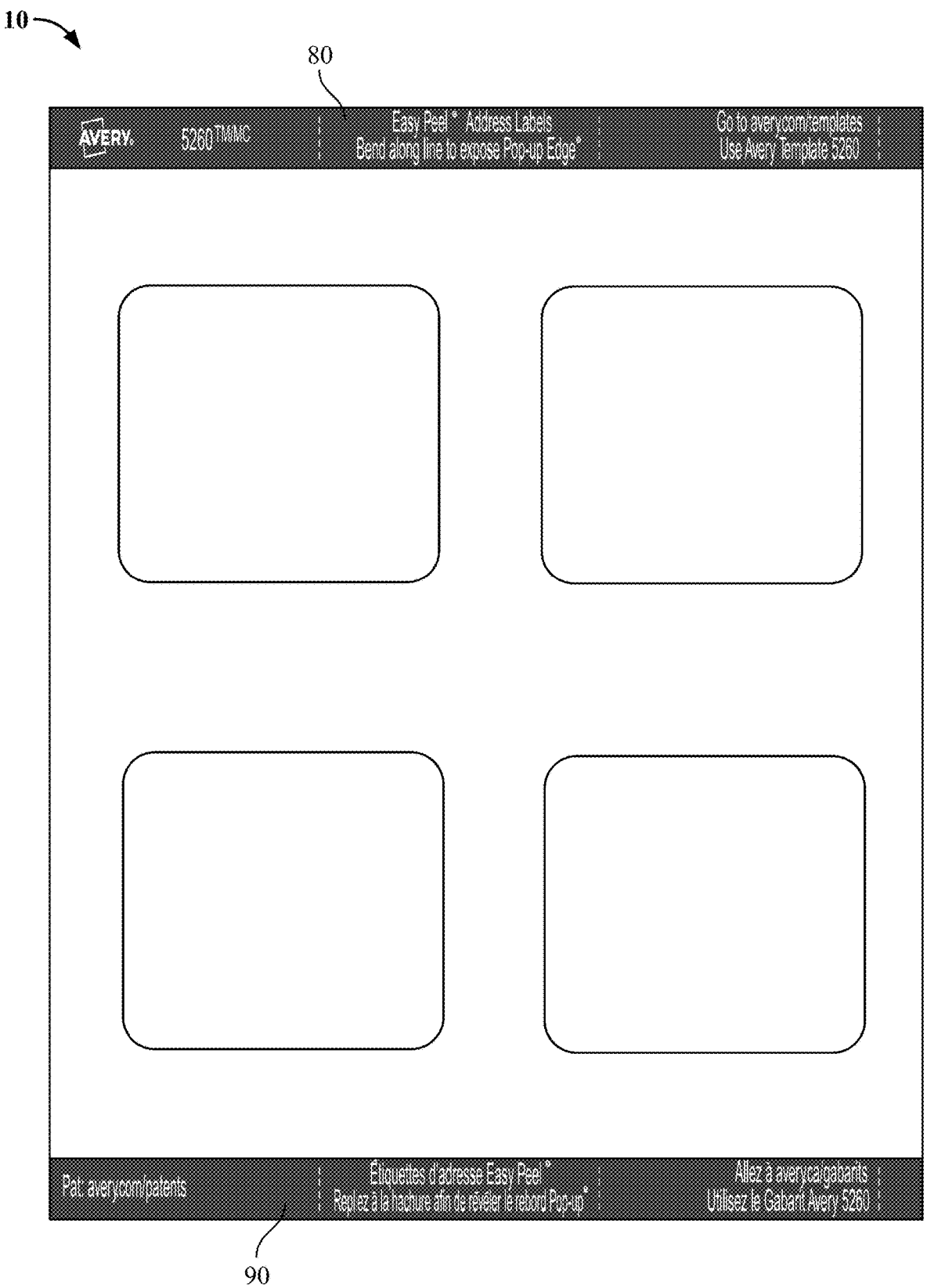
FIG. 7 is a plan view of an embodiment of the label sheet assembly in accordance with an embodiment of the present disclosure.

The header portion 120 and footer portion 130 may include solid print or text thereon having a different color than the remainder of the header portion 120 and footer portion 130. In other embodiments, FIGS. 6 and 7 illustrate label sheet assemblies 10 without the alignment features 100 of FIG. 5.

FIG. 8 illustrates a label sheet assembly 10 having surface features 80, 90 with a combination of surface features. These surface elements may be printed or embossed and may be a grip strip pattern of elevated elements. In this embodiment, the pattern may include of a plurality of dots and a plurality of carets in various aligned configurations. In particular, each pattern may be spaced in a column adjacent one another along the header portion 120 and footer portion 130.

FIG. 9 illustrates a plan view of a back or bottom surface 24 of the liner sheet 40. The bottom surface 24 is opposite from the indicia receiving top surface 22 of the label sheet assembly 10. The bottom surface 24 may also include at least one of the first surface feature 80 and the second surface feature 90. In one embodiment, the surface features 80, 90 of the bottom surface 24 may generally align with the surface features 80, 90 of the top side 22. Additionally, various indicia may be provided along the bottom surface 24 of the liner sheet 40, the indicia may indicate instructions or brand marks or any other indicia and this application is not limited.

The surface features 80, 90 may reduce the bending resistance of the leading edges 12 and trailing edges 14 of the label sheet assembly 10 and may be formed such that they have minimal impact on the smoothness of the liner sheet 40 to minimize likelihood of adjacent sheets to nest or stick together. Otherwise, sheet nesting of adjacent sheets may result in the error of more than one sheet being fed into a printer at once.

The addition of surface features 80, 90 may also be incorporated into various label sheet assemblies 10 such as described by commonly owned U.S. Pat. No. 7,709,071, which is incorporated herein by reference.

Also described is a method of creating the label sheet assembly 10 with at least one surface feature 80, 90. The facestock layer 20 may be provided with the adhesive layer 30 along a first side and an indicia substrate 22 along an opposite second side. The liner sheet 40 may be attached to the adhesive layer 30 of the facestock layer 40. At least one cut line 50 is applied the facestock layer 20 to define at least one label 60 and a matrix portion 70 of the facestock layer. In one embodiment, the first surface feature 80 may be provided along the header portion 120 and the second surface feature 90 may be provided along the footer 130 portions of the layout. The first and second surface features 80, 90 may be applied with at least one of an ink material, adhesive material, and coating material in a desired pattern. The material may then be cured with a UV light. Alternatively, the first and second surface features 80, 90 may be embossed along the respective header 120 and footer portions 130 in a desired pattern. Further, the first and second surface features 80, 90 may be a printed texture type such as relief varnish or matt ink material. Alternatively, it may be an embossed texture type such as a plurality of patterned micro-cuts or impressions. Additional layout adjustments may be made to align the surface features 80, 90 with the plurality of labels 60. The label sheet assembly may be fed into a printer to print indicia thereon.

Figure 11:
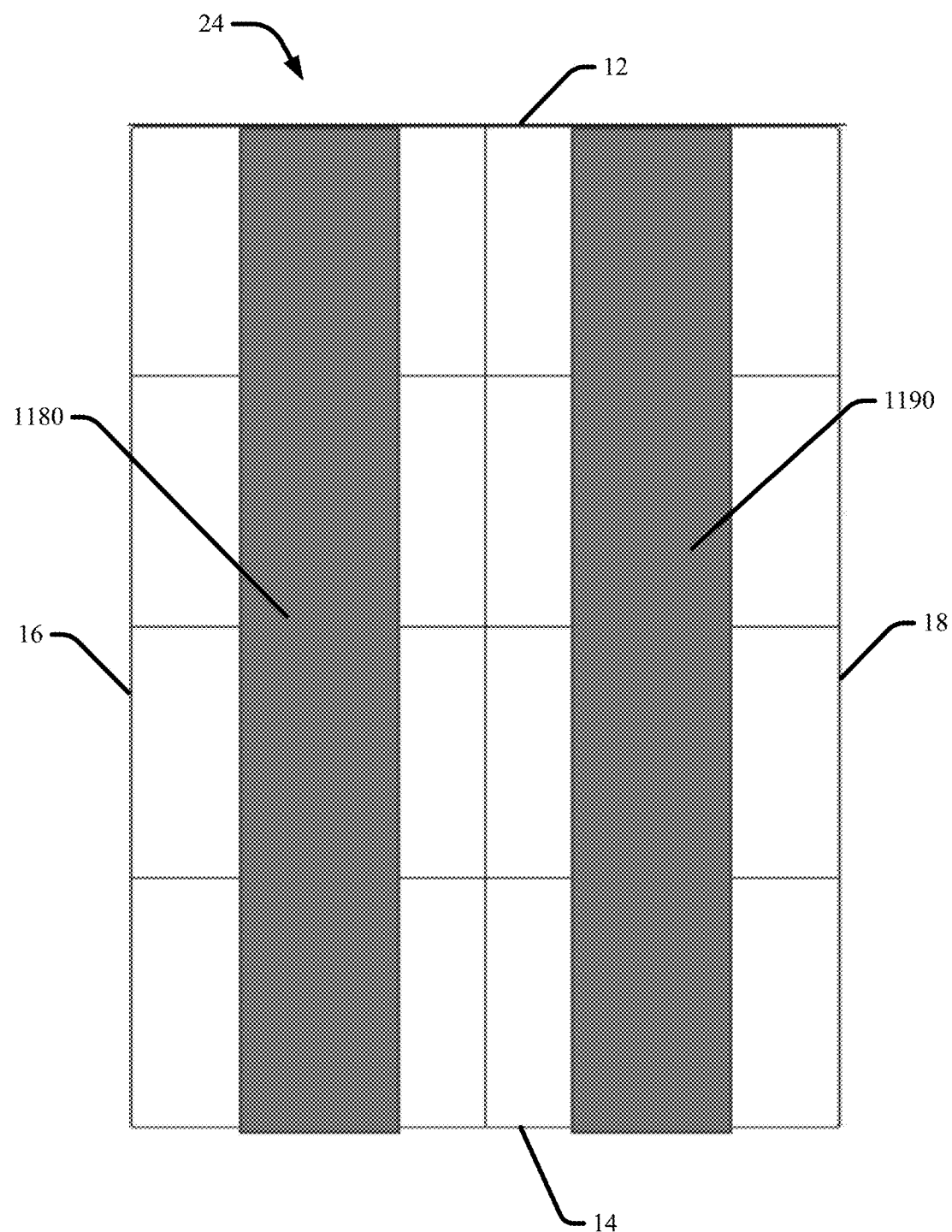
FIG. 11 is a plan view of an embodiment of a back of the label sheet assembly with surface features in accordance with an embodiment of the present disclosure.

Referring to FIG. 11, the bottom surface 24 of the liner sheet 40 may further include at least one vertical surface feature aligned along the processing direction of the label sheet as it is processed through a printer. The at least one vertical surface feature 1180 may be positioned adjacent to the third edge 16 of the label sheet assembly 10 and may extend generally parallel to the third edge 16 between the first edge 12 and the second edge 14. In some embodiments, the surface feature 1180 along the bottom surface 24 may extend all the way from the first edge 12 to the second edge 14 of the label sheet assembly 10. The bottom surface 24 may also include additional vertical surface features 1190. The surface feature 1190 may be positioned adjacent to the fourth edge 18 of the label sheet assembly 10 and may extend generally parallel to the fourth edge 18 between the first edge 12 and the second edge 14. In some embodiments, the surface feature 1190 may also extend all the way from the first edge 12 to the second edge 14 of the label sheet assembly 10. In this embodiment, the surface features 1180, 1190 may be about 2 inches to about 3 inches wide along the first edge 12. The surface feature 1180 may have a different configuration than surface feature 1190. Additionally, these vertically arranged surface features 1180, 1190 may be placed on the bottom surface 24 that also includes surface features 80, 90 positioned only the header and footer of the bottom surface 24 and the arrangement is not limited.

Figure 12:
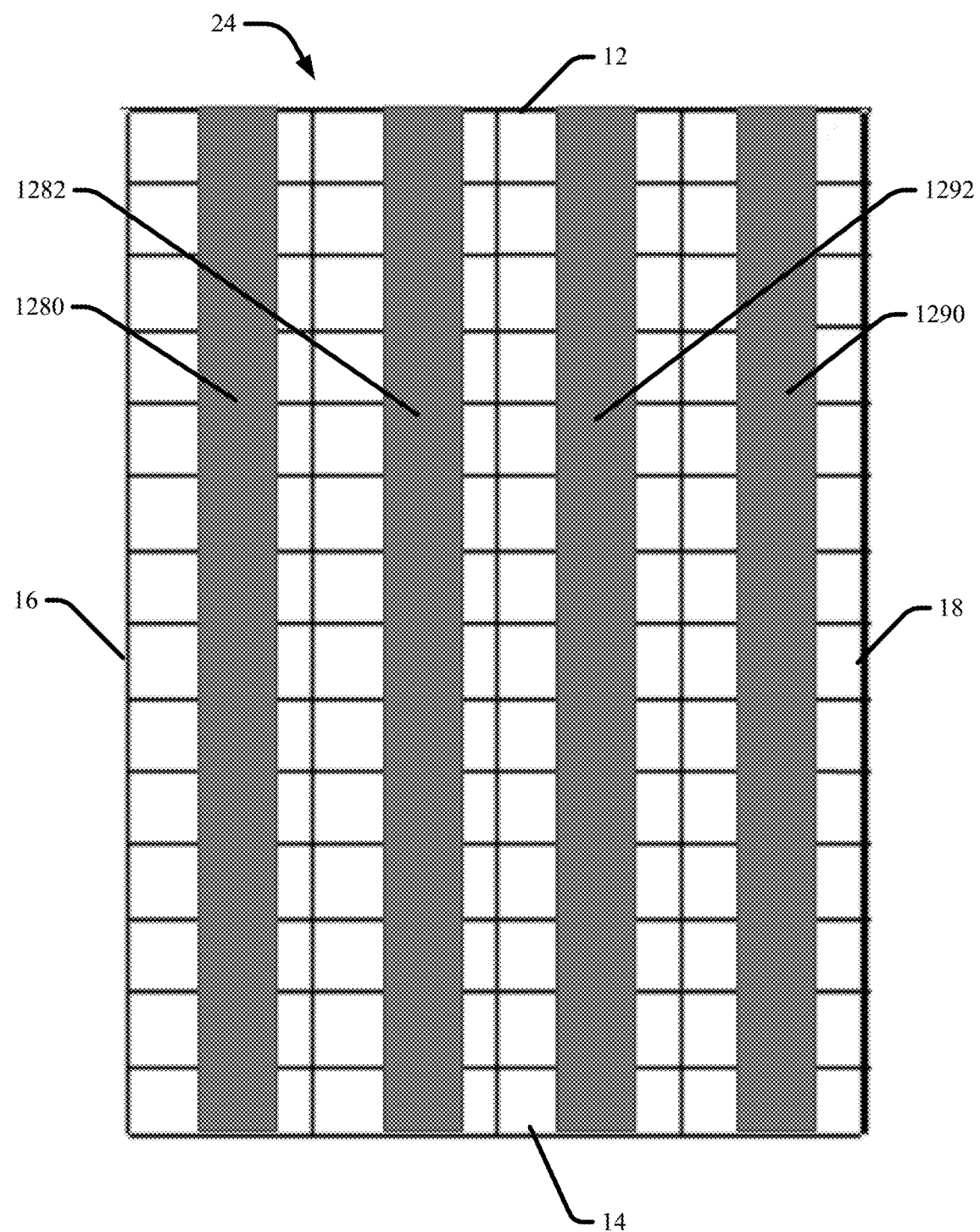
FIG. 12 is a plan view of an embodiment of a back of the label sheet assembly in accordance with the present disclosure.

Referring to FIG. 12, the bottom surface 24 of the liner sheet 40 may further include a plurality of vertical surface features 1280, 1282, 1290, 1292. Surface feature 1280 may be positioned adjacent to the third edge 16 of the label sheet assembly 10 and may extend generally parallel to the third edge 16 between the first edge 12 and the second edge 14. In some embodiments, the surface feature 1280 along the bottom surface 24 may extend all the way from the first edge 12 to the second edge 14 of the label sheet assembly 10. In other embodiments, these surface features may extend along the bottom surface between surface features 80, 90 aligned along the header and footer of the bottom surface 24. Surface feature 1282 may be positioned adjacent to the surface feature 1280 and be positioned generally parallel to the third edge 16 of the label sheet assembly 10 and may extend generally parallel to the surface feature 1280 between the first edge 12 and the second edge 14. Surface feature 1290 may be positioned adjacent to the fourth edge 18 of the label sheet assembly 10 and may extend generally parallel to the fourth edge 18 between the first edge 12 and the second edge 14. In some embodiments, the surface feature 1290 may also extend all the way from the first edge 12 to the second edge 14 of the label sheet assembly 10. Surface feature 1292 may be positioned adjacent to the surface feature 1290 and generally parallel to the fourth edge 18 of the label sheet assembly 10 and may extend generally parallel to the surface feature 1290 between the first edge 12 and the second edge 14. In this embodiment, the surface features 1280, 1282, 1290, 1292 may be about 2 inches to about 3 inches wide along the first edge 12. The plurality of surface features 1280, 1282, 1290, 1292 may also have a different configuration than one another.

Figure 13:
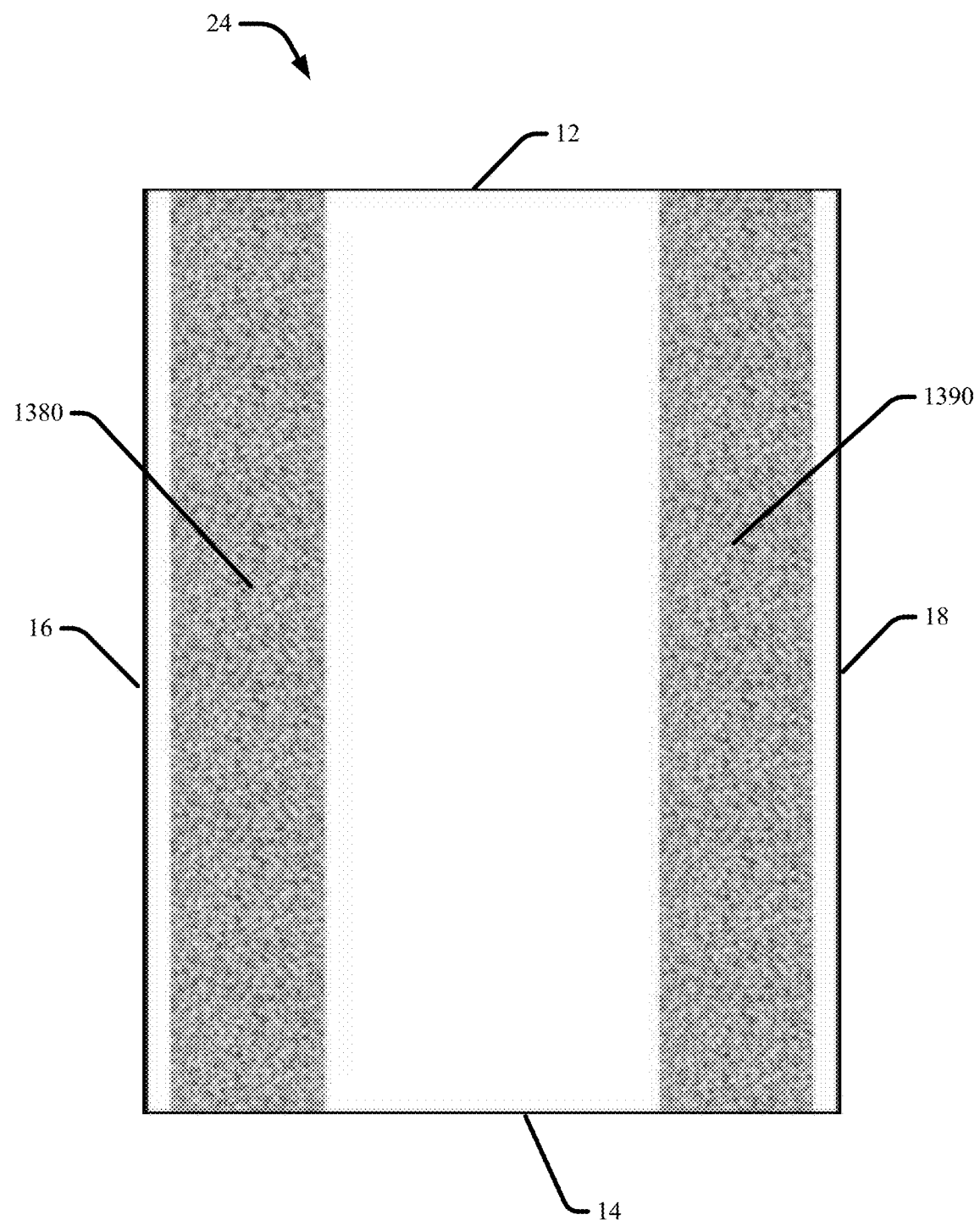
FIG. 13 is a plan view of an embodiment of a back of the label sheet assembly in accordance with the present disclosure.

FIG. 13 illustrates an embodiment of the label sheet assembly with vertical surface features along the bottom surface 24 of the liner sheet in accordance with the present disclosure. Surface feature 1380 may be positioned adjacent to the third edge 16 of the label sheet assembly 10 and may extend generally parallel to the third edge 16 between the first edge 12 and the second edge 14. There may be a slight space between third edge 16 and surface feature 1380. The surface feature 1380 along the bottom surface 24 may extend all the way from the first edge 12 to the second edge 14 of the label sheet assembly 10. The surface feature 1390 may be positioned adjacent to the fourth edge 18 of the label sheet assembly 10 and may extend generally parallel to the fourth edge 18 between the first edge 12 and the second edge 14. There may be a slight space between fourth edge 18 and surface feature 1390. In some embodiments, the surface feature 1390 may also extend all the way from the first edge 12 to the second edge 14 of the label sheet assembly 10. Alternatively, surface features 80, 90 may also exist along the header and footer portions in which the surface features 1380, 1390 extend therebetween.

Figure 14:
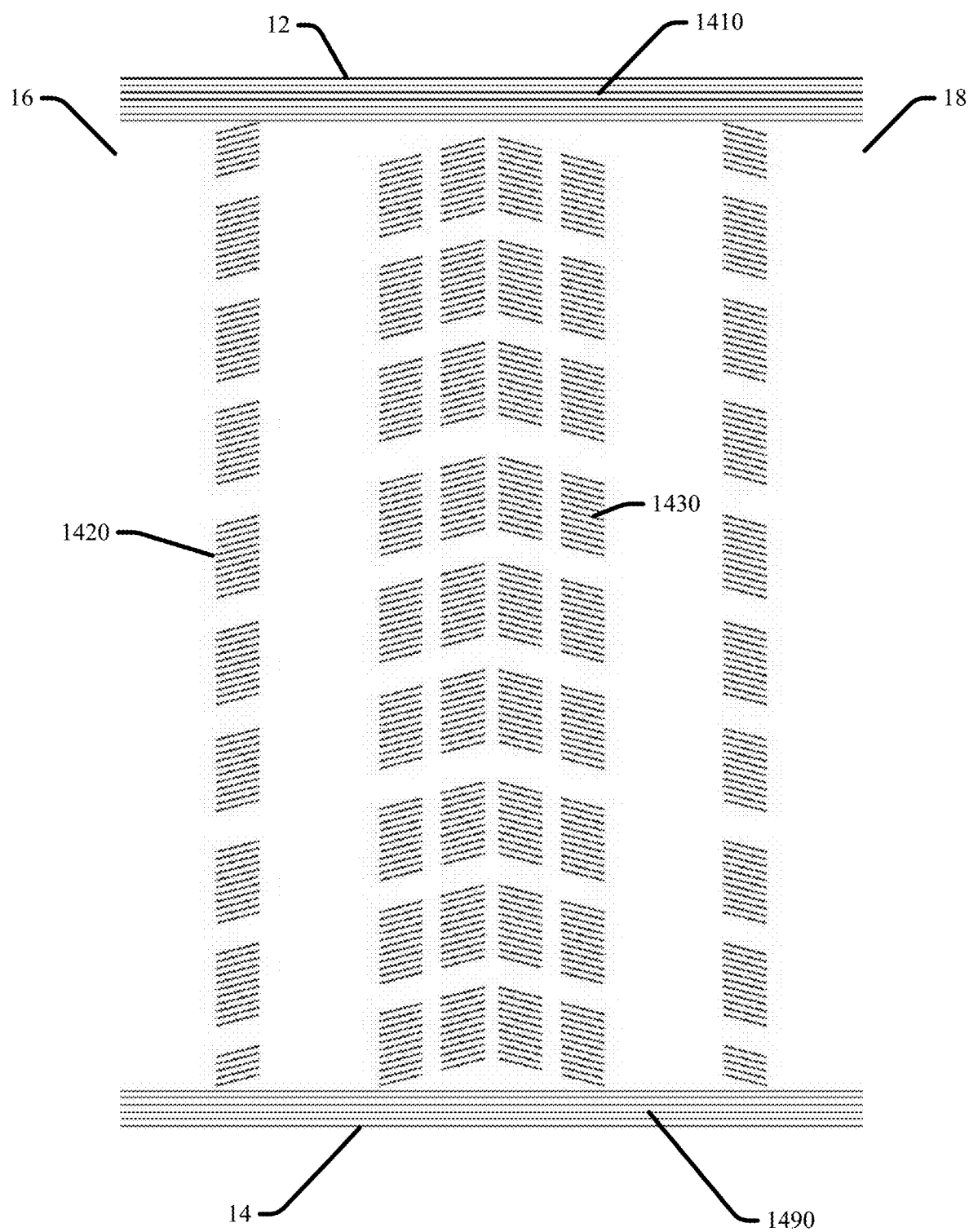
FIG. 14 is a plan view of an embodiment of a back of the label sheet assembly in accordance with the present disclosure.

FIG. 14 illustrates various types of surface features along the bottom surface of the label sheet assembly including both horizontal surface features 1410, 1490 and vertical surface features 1420, 1430 aligned generally perpendicular relative to one another. In one embodiment, the horizontal surface features 1410, 1490 may be located on the back or bottom surface 24 of the liner sheet 40. Surface feature 1410 may be positioned adjacent to the first edge 12 of the label sheet assembly 10 and may extend generally parallel to the first edge 12 between the third edge 16 and the fourth edge 18. The surface feature 1410 may include a plurality of dots, a plurality of lines or a combination of a variety of configurations as illustrated in the Figures. The surface features 1410 and 1490 may be similar to surface features 80, 90 and this disclosure is not limited in this regard. Surface feature 1490 may be positioned adjacent to the second edge 14 of the label sheet assembly 10 and may extend generally parallel to the second edge 14 between the third edge 16 and the fourth edge 18. The surface feature 1490 may also include a plurality of dots, a plurality of lines, or a combination of both. The lines may be of various lengths and may be arranged relative to one another.

The embossed texture surface feature may be provided along the feed edges to provide tactile perspective to a user and also to improve feeding characteristics when processing the label sheet through a printer. In this embodiment, the horizontal surface features 1410, 1490 may include a tactile varnish that may be protrude about 5 µm to about 20 µm high along the first edge 12. The surface feature 1410 may have a different configuration than surface feature 1490. It should be understood, however, that this is merely one embodiment and that the present system may apply to any of the label sheet assembly 10. For the sake of brevity of the present disclosure, not every example is included, but the present application contemplates any appropriate such label sheet assemblies 10.

The vertical surface features 1420, 1430 may visually assist a user to align the label sheet assembly 10 with a printer to be processed therein. In this embodiment, the vertical surface features 1420, 1430 include markings with an arrow or chevron shape relative to the leading edges 12, 14. The vertical surface feature 1420 may be positioned adjacent to the third edge 16 of the label sheet assembly 10 and may extend generally parallel to the third edge 16 between the first edge 12 and the second edge 14. In some embodiments, surface feature 1420 may extend all the way from the first edge 12 to the second edge 14 of the label sheet assembly 10. The horizontal surface features 1410, 1490 and the vertical surface features 1420, 1430 may include a plurality of dots, a plurality of cut lines, or a combination of various shapes. The plurality of horizontal surface features 1410, 1490 and vertical surface features 1420, 1430, as illustrated by FIG. 14, may be arranged along an area of the back of the liner sheet where printer feeding devices are positioned. The vertical surface features 1420, 1430 may be generally parallel to the long edge of the sheet and go from the top to the bottom edge of the sheet. As the surface may extend the length of the sheet, sheet feeding in printers may be consistent and misalignment of print may be avoided. The surface features may be provided to improve the accuracy of indicia application while undergoing stresses caused by processing the label sheet assembly 10 though the printer.

Figure 15:
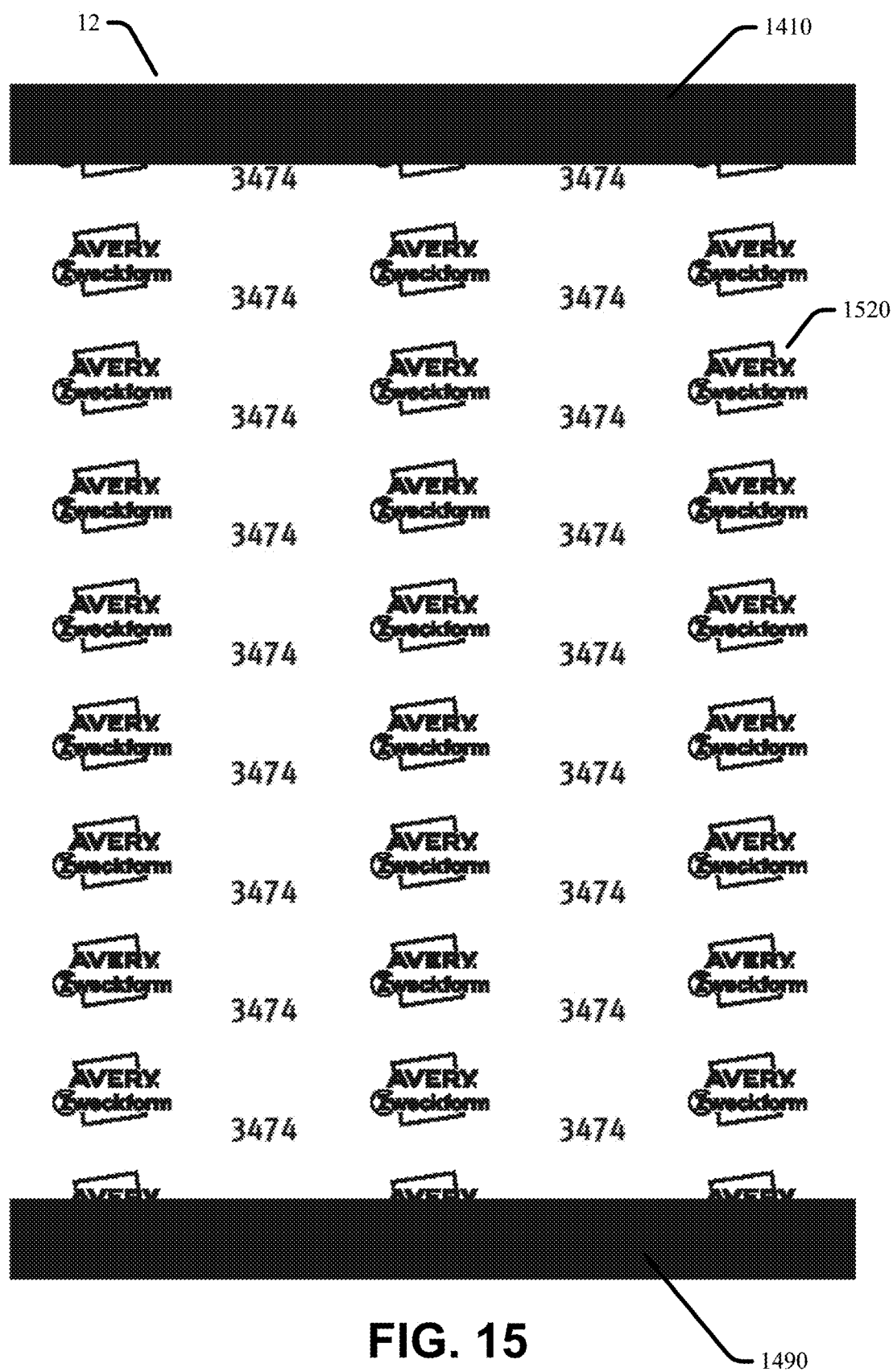
FIG. 15 is a plan view of an embodiment of a back of the label sheet assembly in accordance with the present disclosure.

FIG. 15 illustrates surface features 1410, 1490 including different sections, various designs, and various indicia printed thereon in addition to other surface features. The indicia may indicate the brand mark 1520 or associate website of the label sheet assembly 10. The brand mark 1520 may be a raised surface feature as described and include indicia representative of a website representative of a type of template associated with the label sheet assembly 10. The website may allow a user to easily incorporate the appropriate template associated with a word processor program to process and align text or other indicia with the indicia receiving portions of the labels 60. The plurality of surface features as illustrated by FIG. 15 may be arranged along an area of the back of the liner sheet where printer feeding devices are positioned.

The embodiments of the surface features 1180, 1190, 1410, 1490 as illustrated by FIGS. 11-15 may have a combination of surface elements as illustrated by FIG. 10. The combination may be optimized for traction to improve printer processing, ease of handling the sheets by the user, and visual aesthetics. Further, the bottom surface features 1180, 1190 may be a zone of increased traction, friction, tactile sensitivity, or flexibility imparted by coating or embossing to improve printer processing. Printing processing issues may be improved to reduce the skewing of printed indicia during printing through a printer device and reduce the occurrence of having multiple sheets fed through the printer at once, leading to jam.

Figure 18:
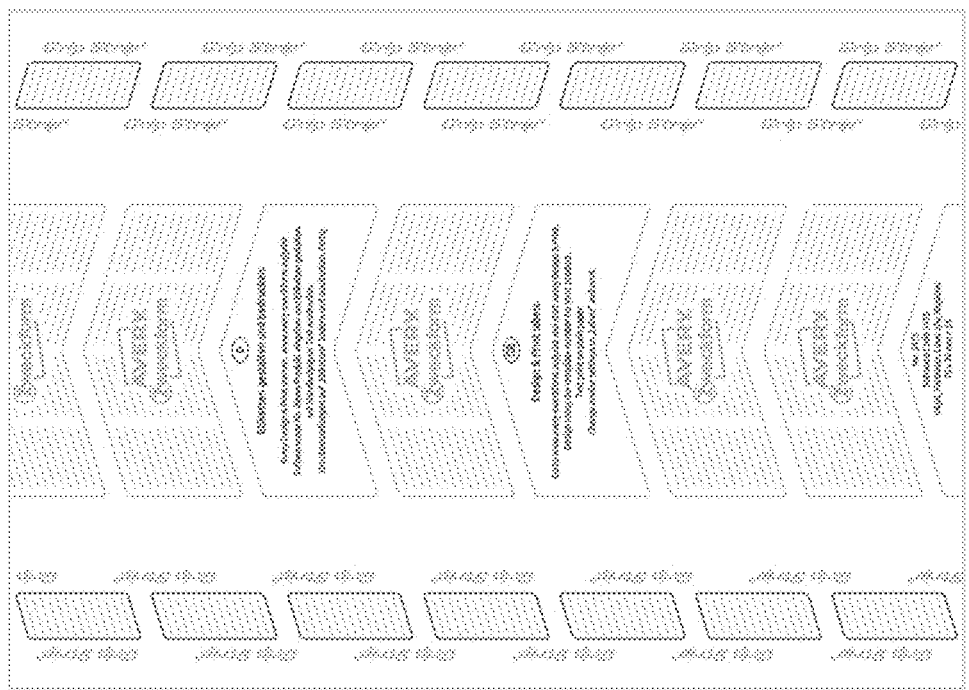

In another embodiment as illustrated by FIGS. 16, 17, and 18, the pattern of the printed texture of the bottom surface features 1180, 1190 may include at least one of the randomization pattern, the angled orientation, and the grip strip pattern. These figures illustrate a tire tread pattern but, notably, any type of pattern may be utilized and be aligned along header and footer and also include a vertical orientation aligned along the third edge 16 or the fourth edge 18 of the label sheet assembly 10. This disclosure in not limited to the pattern or quantity of surface features utilized in a label sheet assembly 10. In this embodiment, the first vertical surface features 1180 are aligned along the third edge 16 and the second vertical surface features 1190 are aligned along the third edge 18 and middle vertical surface features 1210 are aligned along the center portion of the bottom surface 24. Here the first and second vertical surface features 1180, 1190 have common configurations that include a plurality of spaced areas with rounded outer edges with printed texture in the form of grip strip relief varnish. The grip strip relief varnish may be touch sensitive to a user for tactile feel. The third vertical surface features 1210 include a plurality of spaced areas 1212 aligned with the plurality of spaced areas of the first and second vertical surface features 1180, 1190. The plurality of spaced areas 1212 of the third vertical surface features 1210 include a generally arrow or carrot shape with rounded edges in which a pinnacle 1216 of the spaced arrows are aligned along a central axis of the sheet. Printed texture in the form of grip strip relief varnish may be within the spaced area and outer portions 1214 may be aligned with the spaced areas 1182, 1192 of the first and second vertical surface features 1180, 1190. It is also noted that the printed texture embodiment may be accompanied with various indicia and color schemes along a bottom header portion 1410 and a bottom footer portion 1490 of the liner sheet 40. FIG. 17 illustrates the label sheet assembly with the header and footer surface features 1410, 1490 while FIG. 18 illustrates the label sheet assembly without them.

Figure 20:
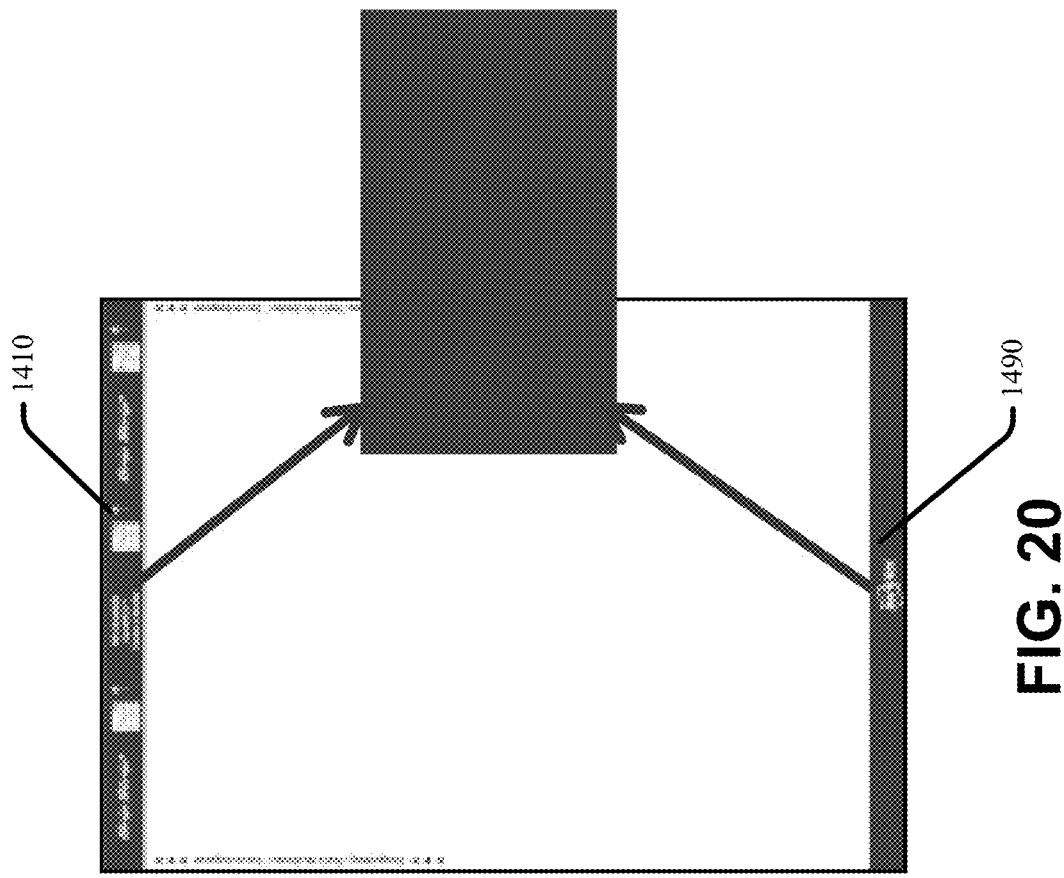
FIG. 20 is a plan view of an embodiment of a back of the label sheet assembly in accordance with the present disclosure.
Figure 19:
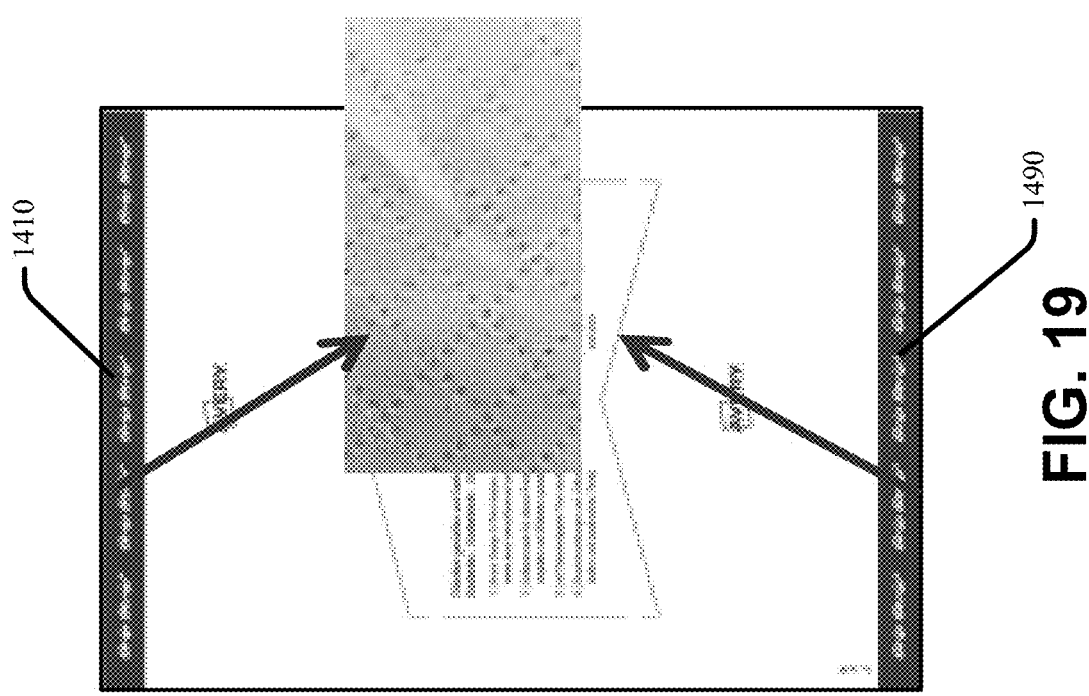
FIG. 19 is a plan view of an embodiment of a back of the label sheet assembly in accordance with the present disclosure.

In other embodiments, the bottom surface features 1180, 1190, 1212, 1410, 1490 may include either the printed texture or the embossed texture applied to the bottom surface 24 of the liner sheet 40. In one embodiment, surface features 1410, 1490, as illustrated by FIG. 19, may include embossed texture in the form of a plurality of micro-cuts being arranged in a pattern such as a diamond type pattern. The embossed texture surface feature may also be utilized with label sheet assemblies 10 that are made from contrasting colors from the remaining portion of the label sheet assembly 10. The embossed texture surface feature may be provided along the feed edges to provide tactile perspective to a user and also to improve feeding characteristics when processing the label sheet through a printer. As illustrated by FIG. 20, the surface features 1410, 1490 may also be printed texture in the form of matt ink. It should be understood, however, that the present combination of features may apply to any of the label sheet assemblies 10. For the sake of brevity of the present disclosure, not every example is included, but the present application contemplates any appropriate combination of features.

Further described is a method of creating the label sheet assembly 10 with the bottom surface features 1180, 1190. In one embodiment, the bottom surface features 1180, 1190 may be provided along the third edge 16 and/or the fourth edge 18 of the label sheet assembly 10. The bottom surface features 1180, 1190 may be applied with at least one of an ink material, adhesive material, and coating material in a desired pattern. The material may then be cured with a UV light. Alternatively, the bottom surface features 1180, 1190 may be embossed along the third edge 16 and/or the fourth edge 18 in a desired pattern.

Figure 21:
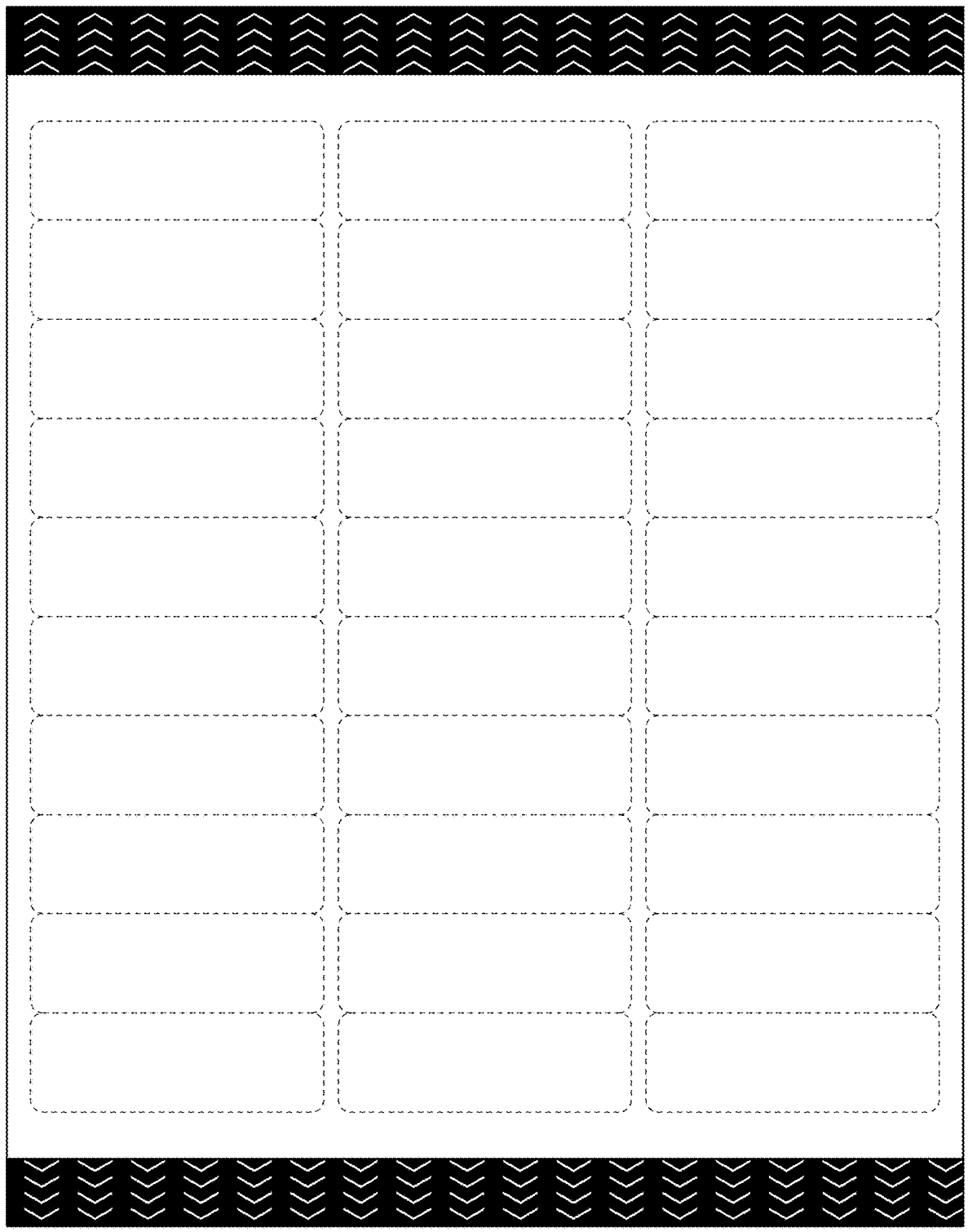
FIGS. 21-53 are plan views of various embodiments of the label sheet assembly in accordance with the present disclosure.
Figure 22:
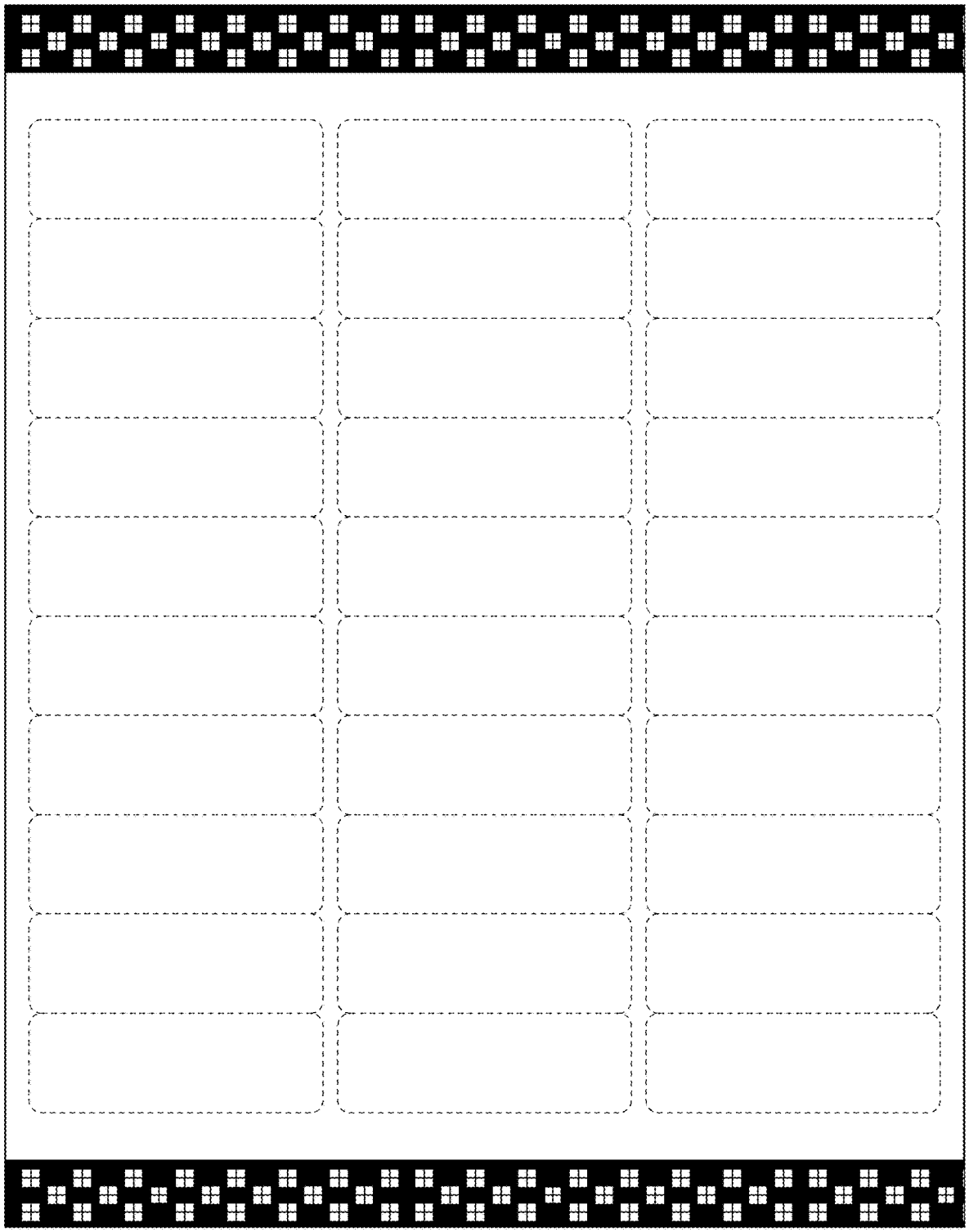
Figure 23:
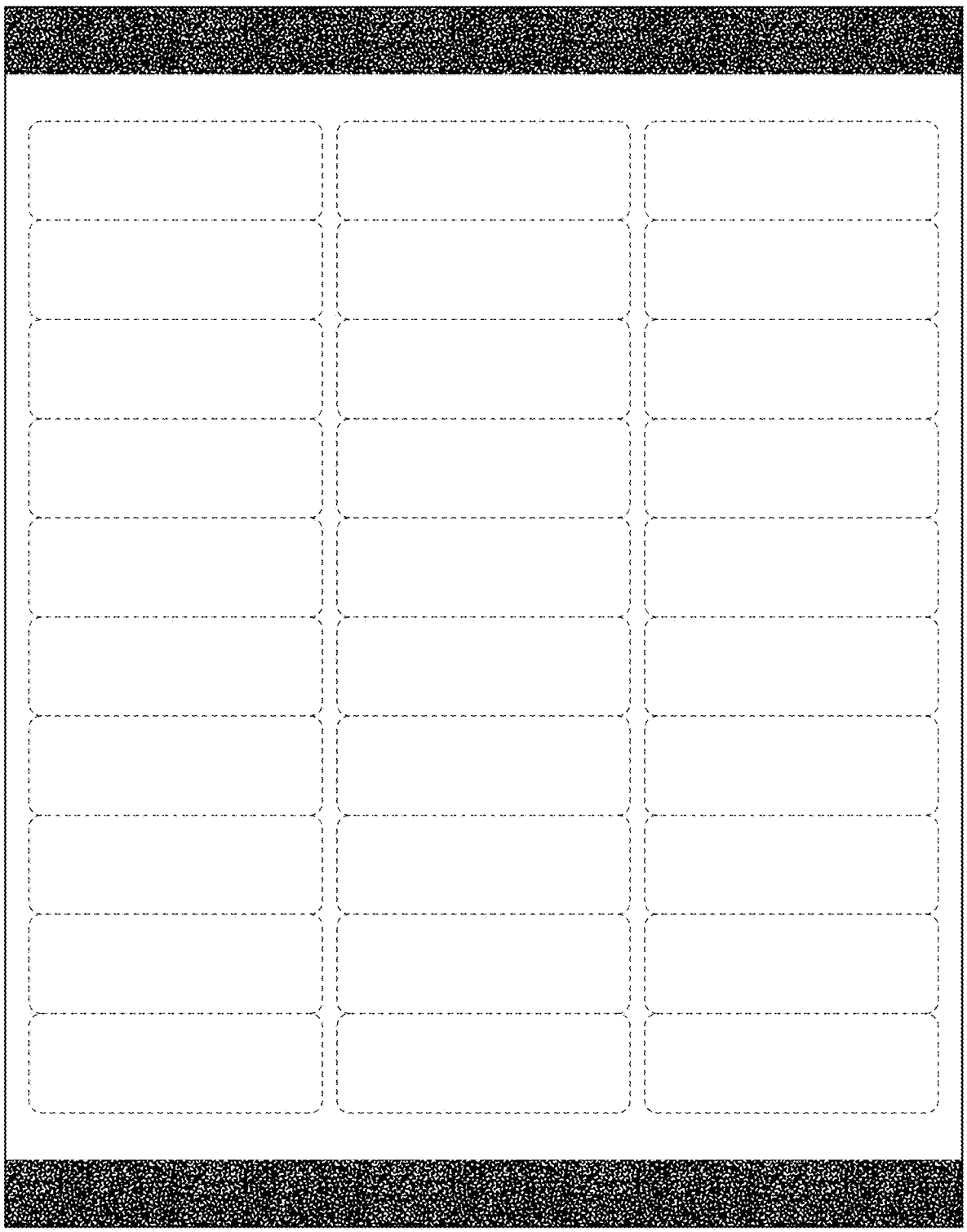
Figure 24:
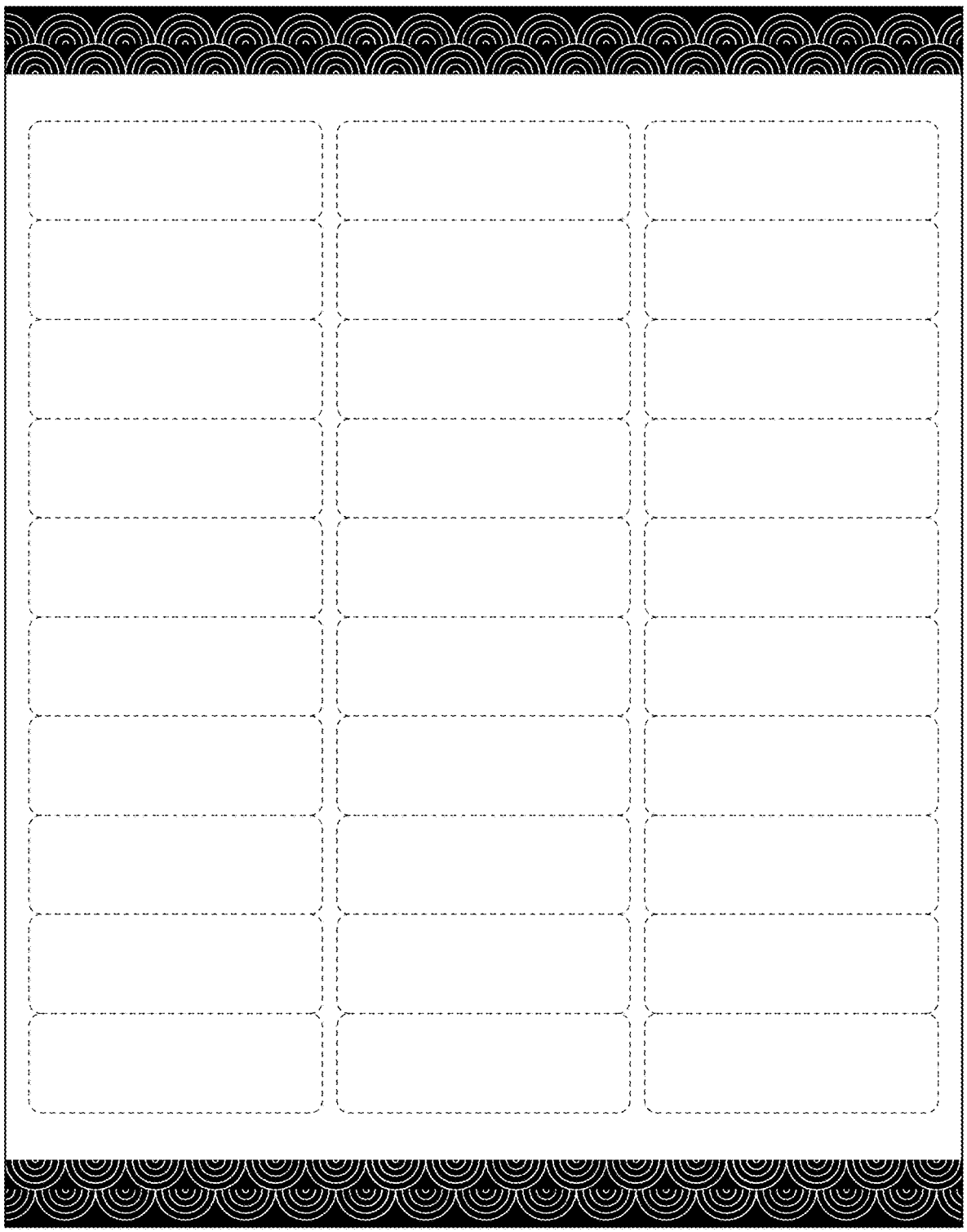
Figure 25:
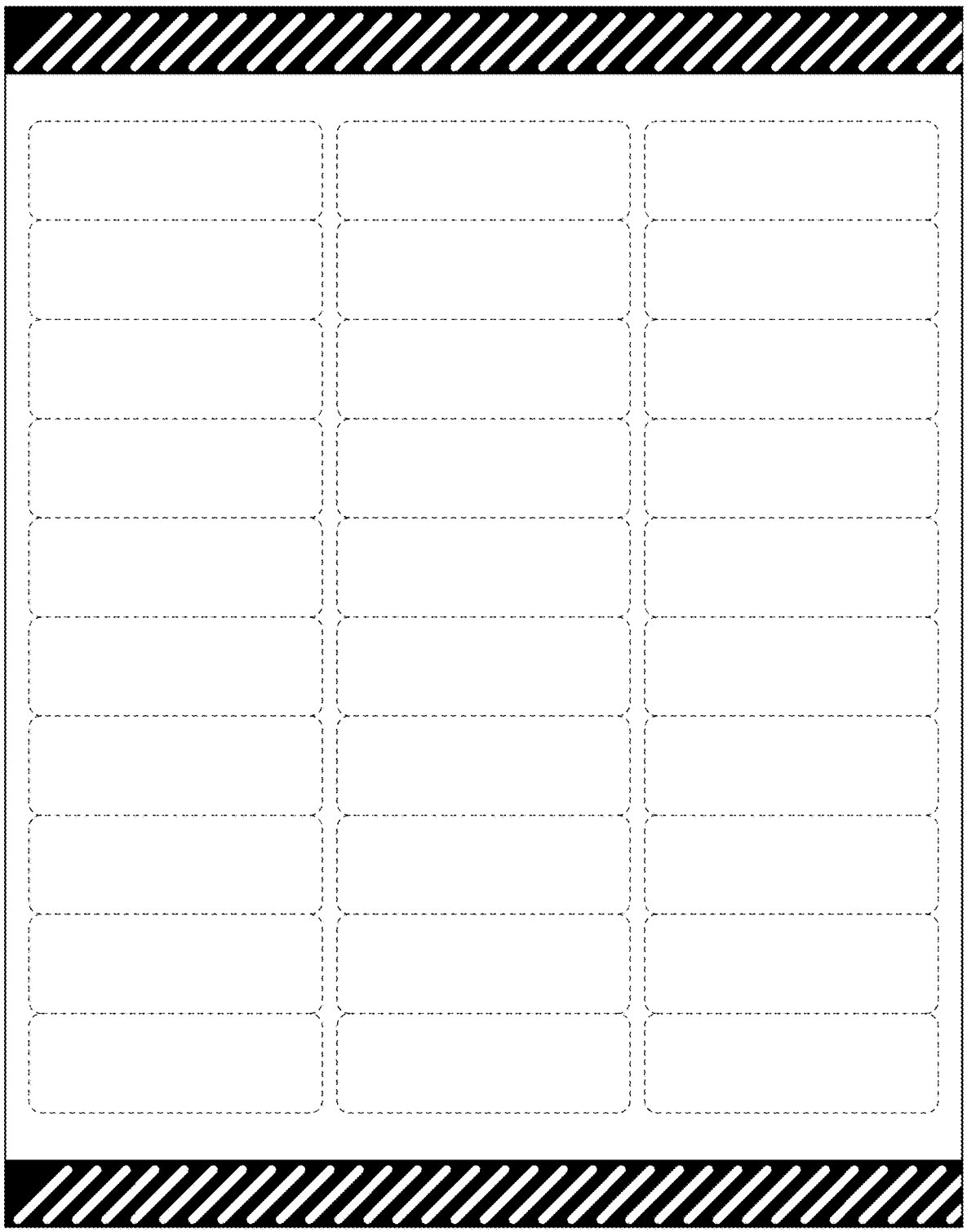
Figure 26:
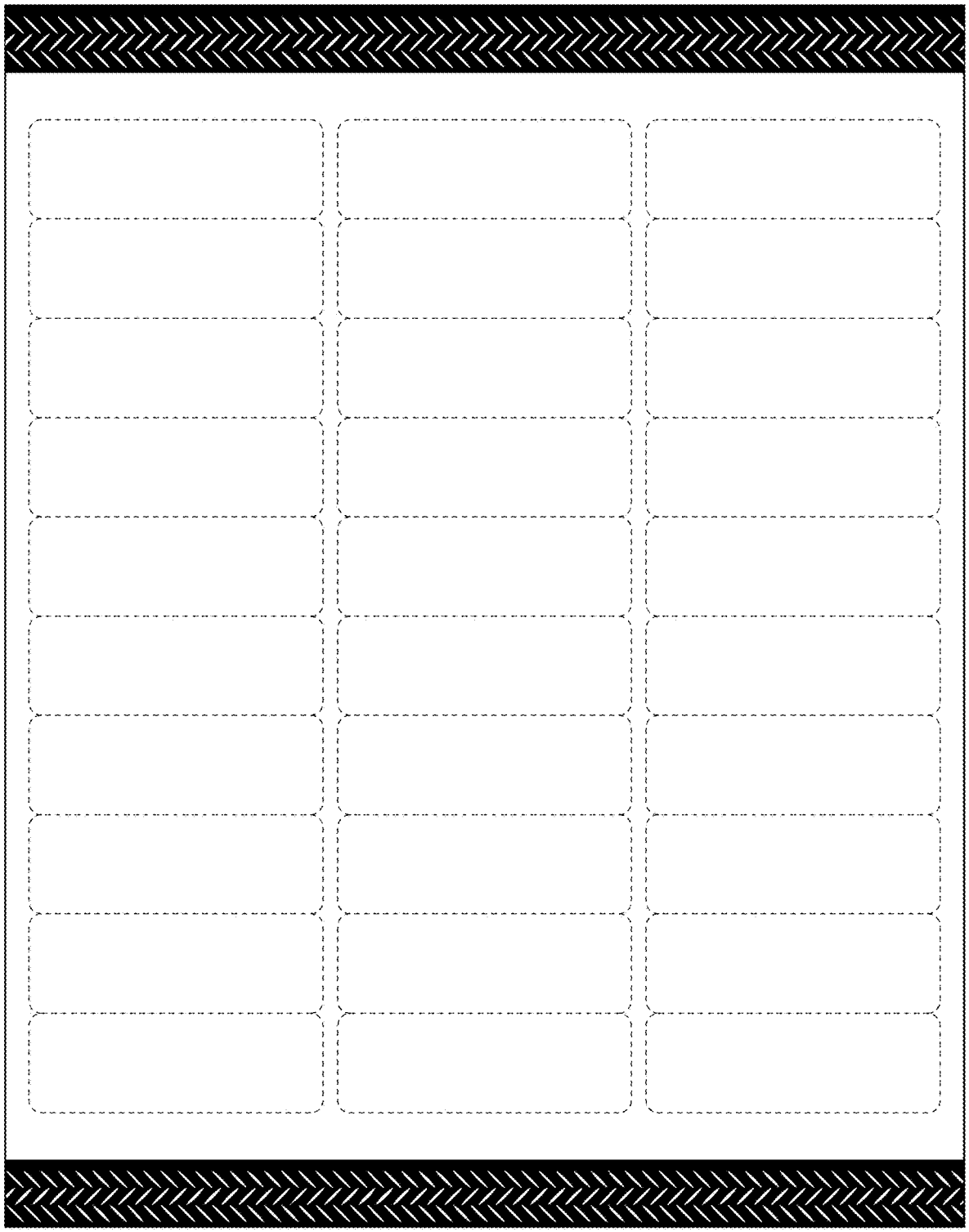
Figure 27:
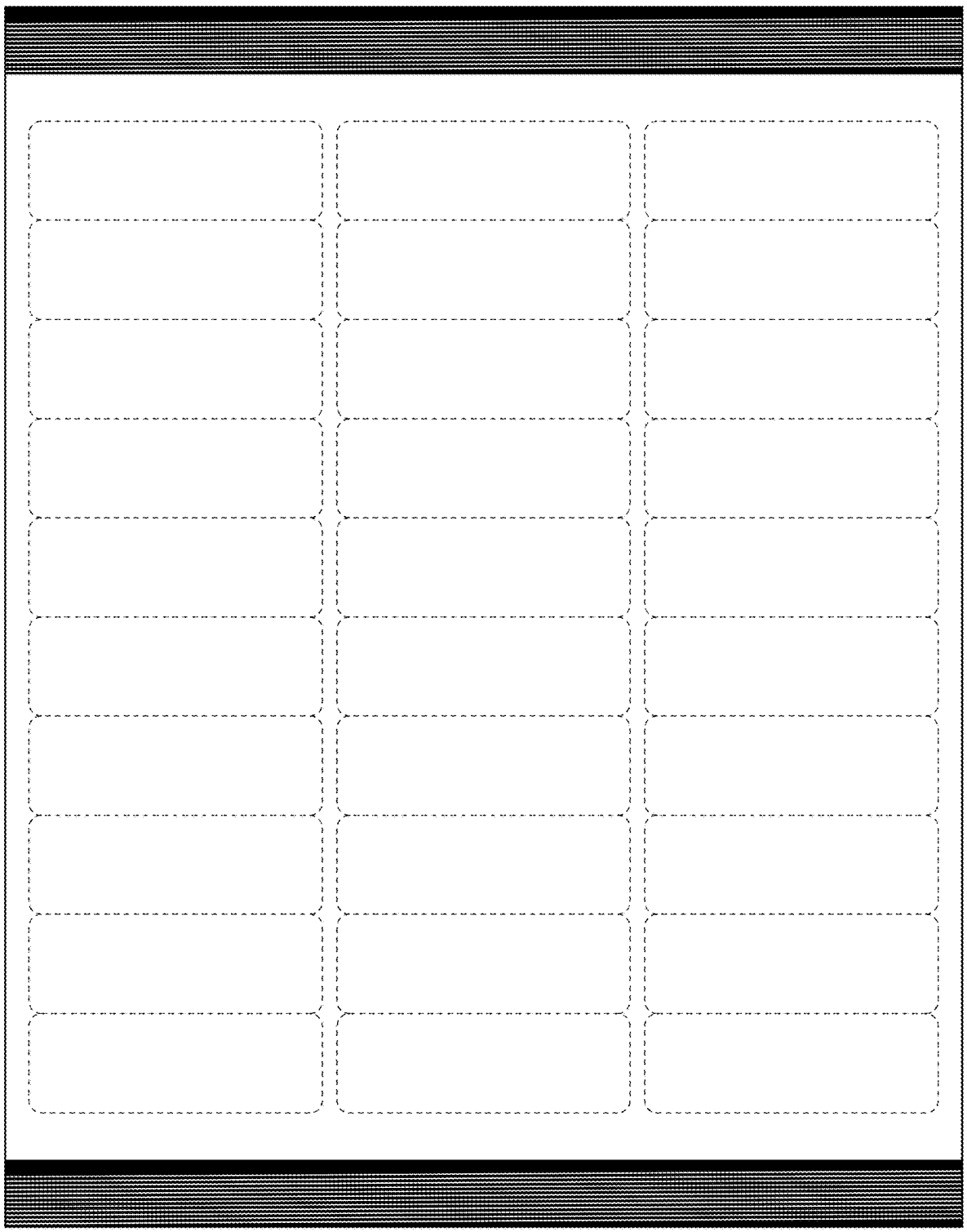
Figure 28:
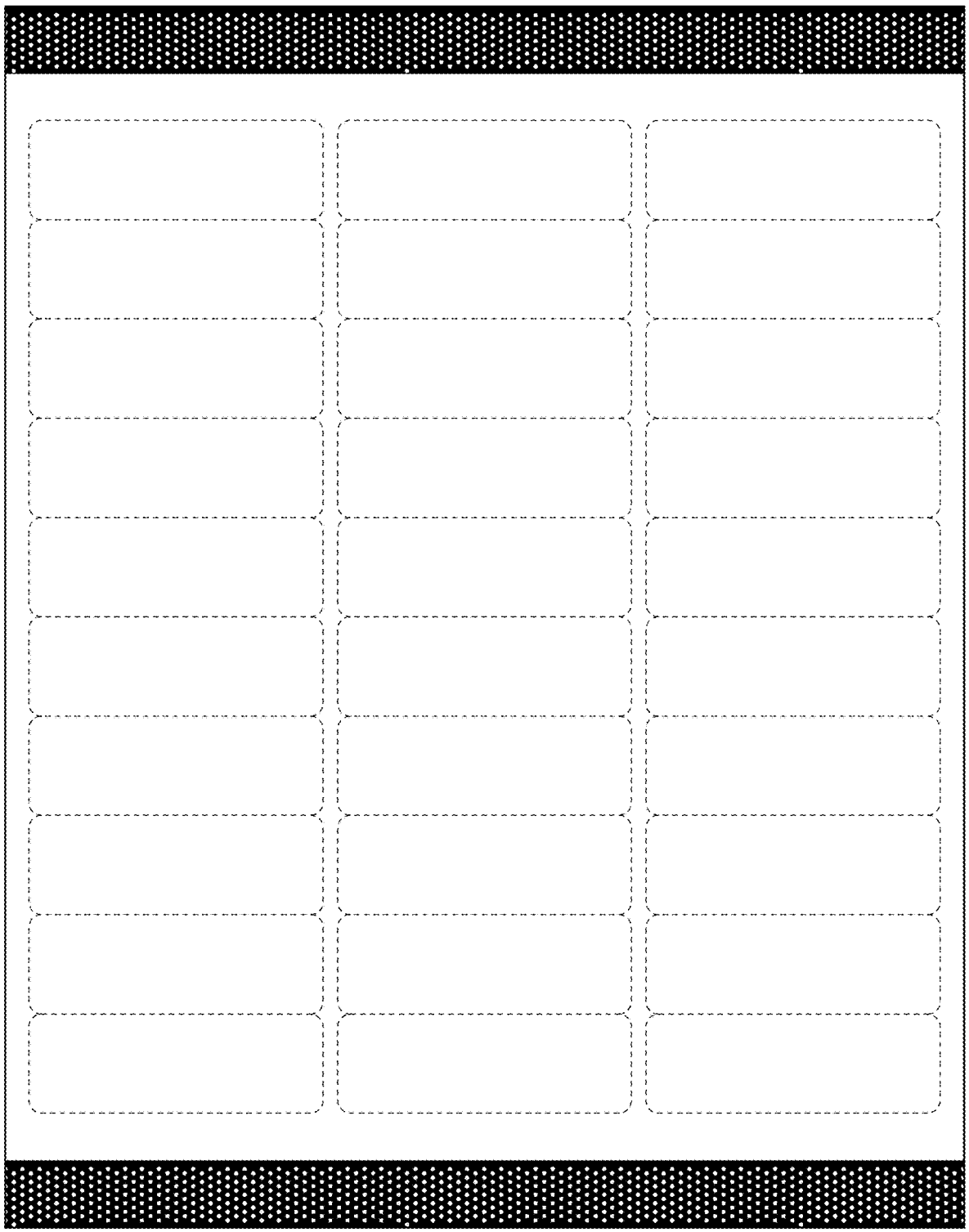
Figure 29:
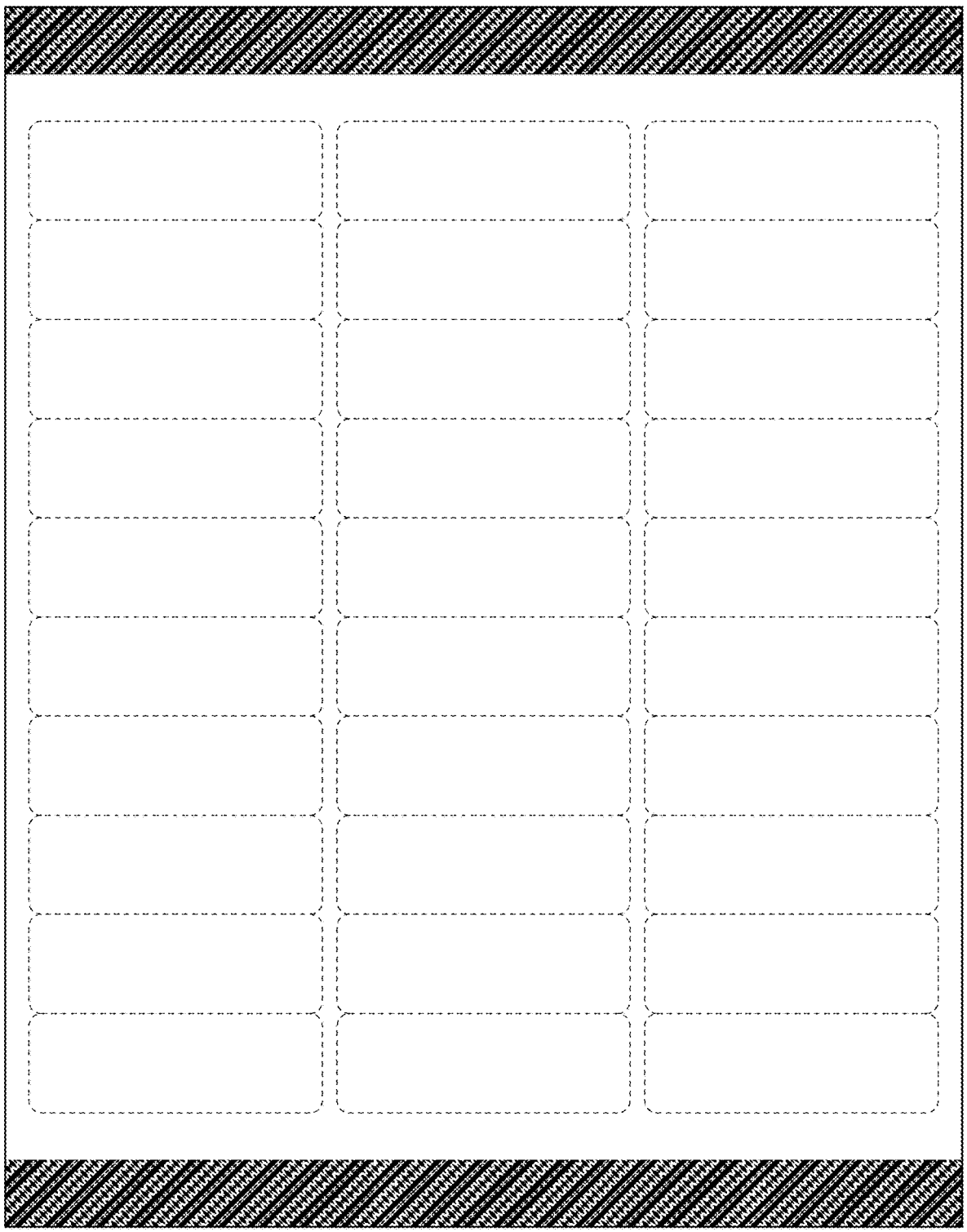
Figure 30:
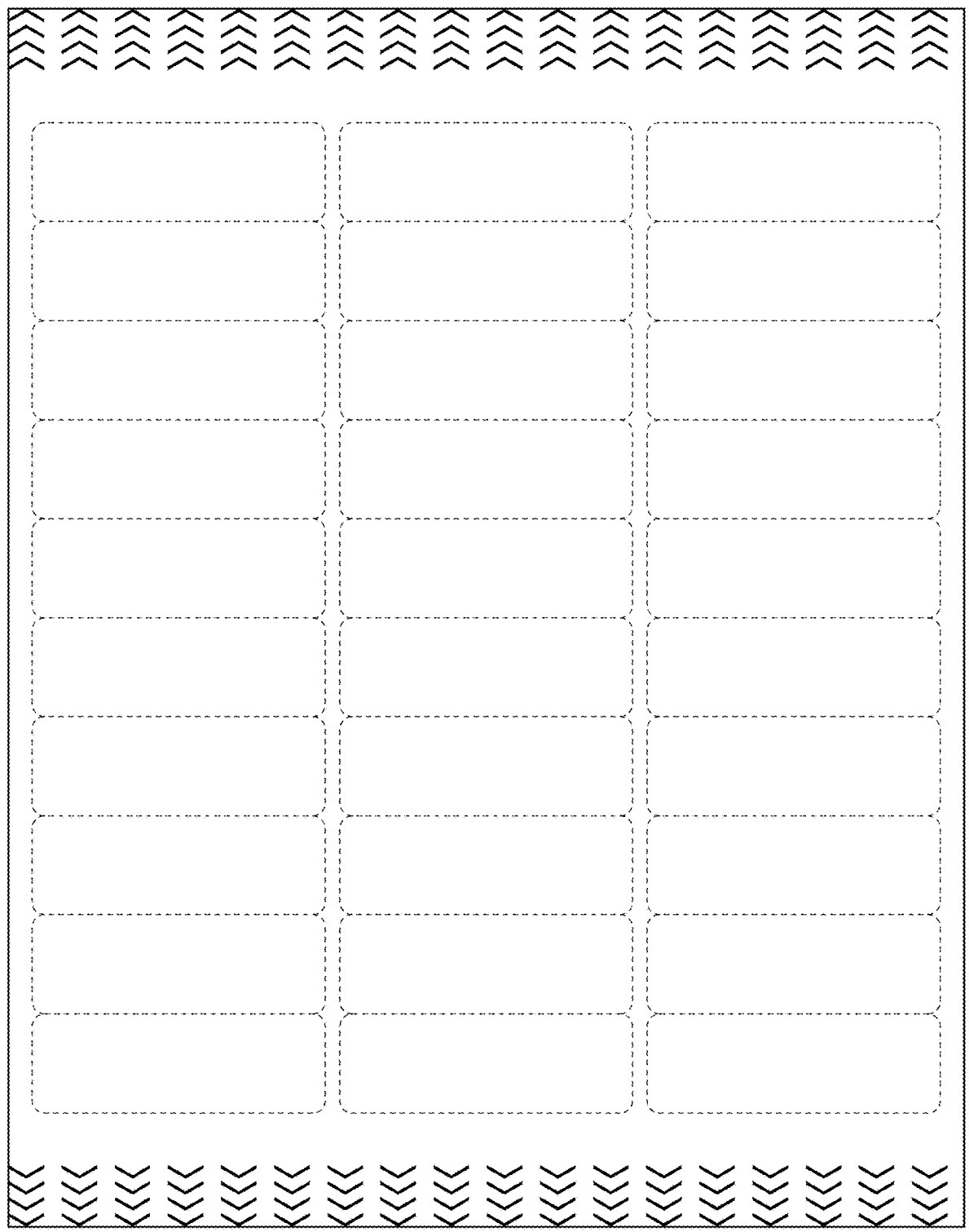
Figure 31:
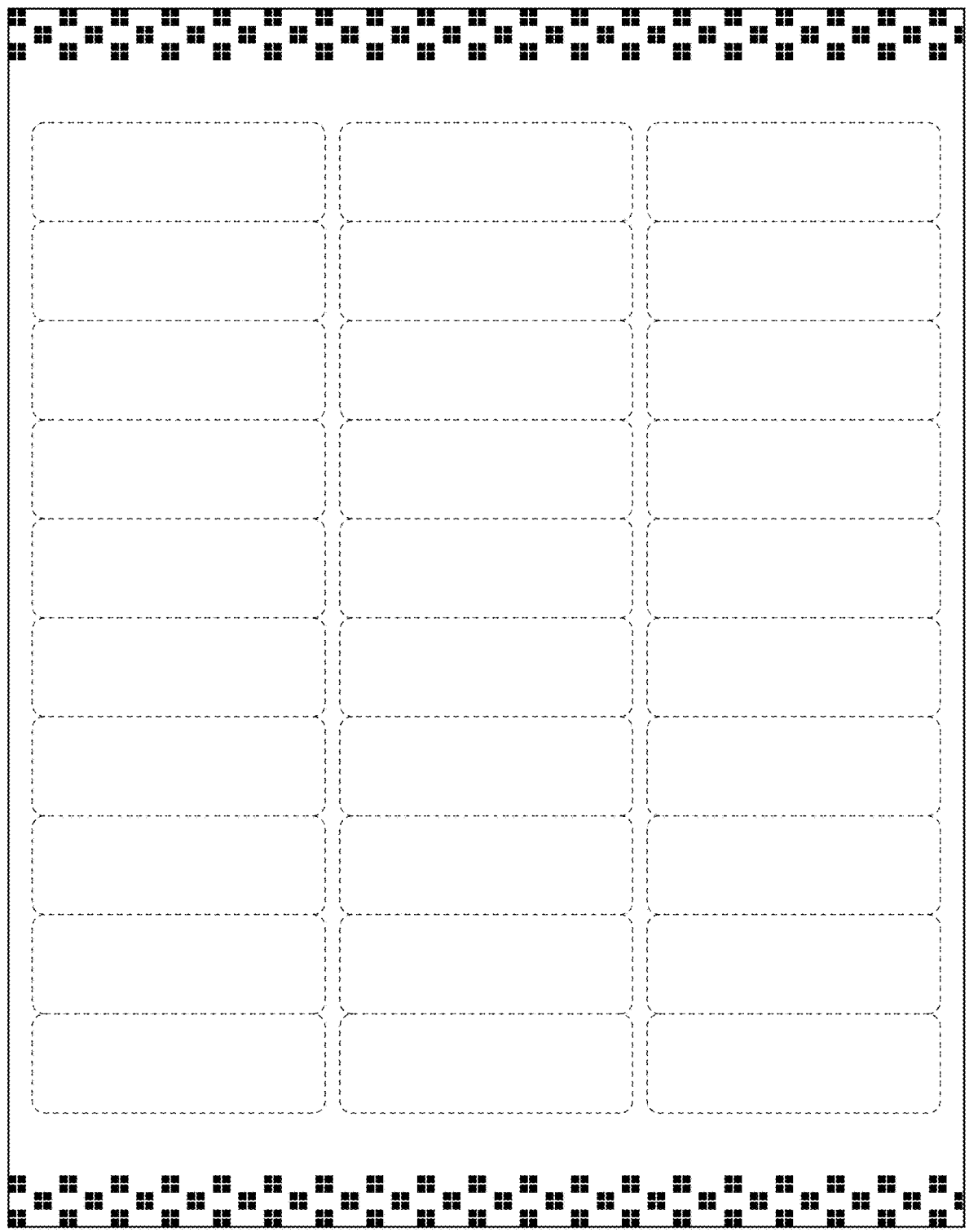
Figure 32:
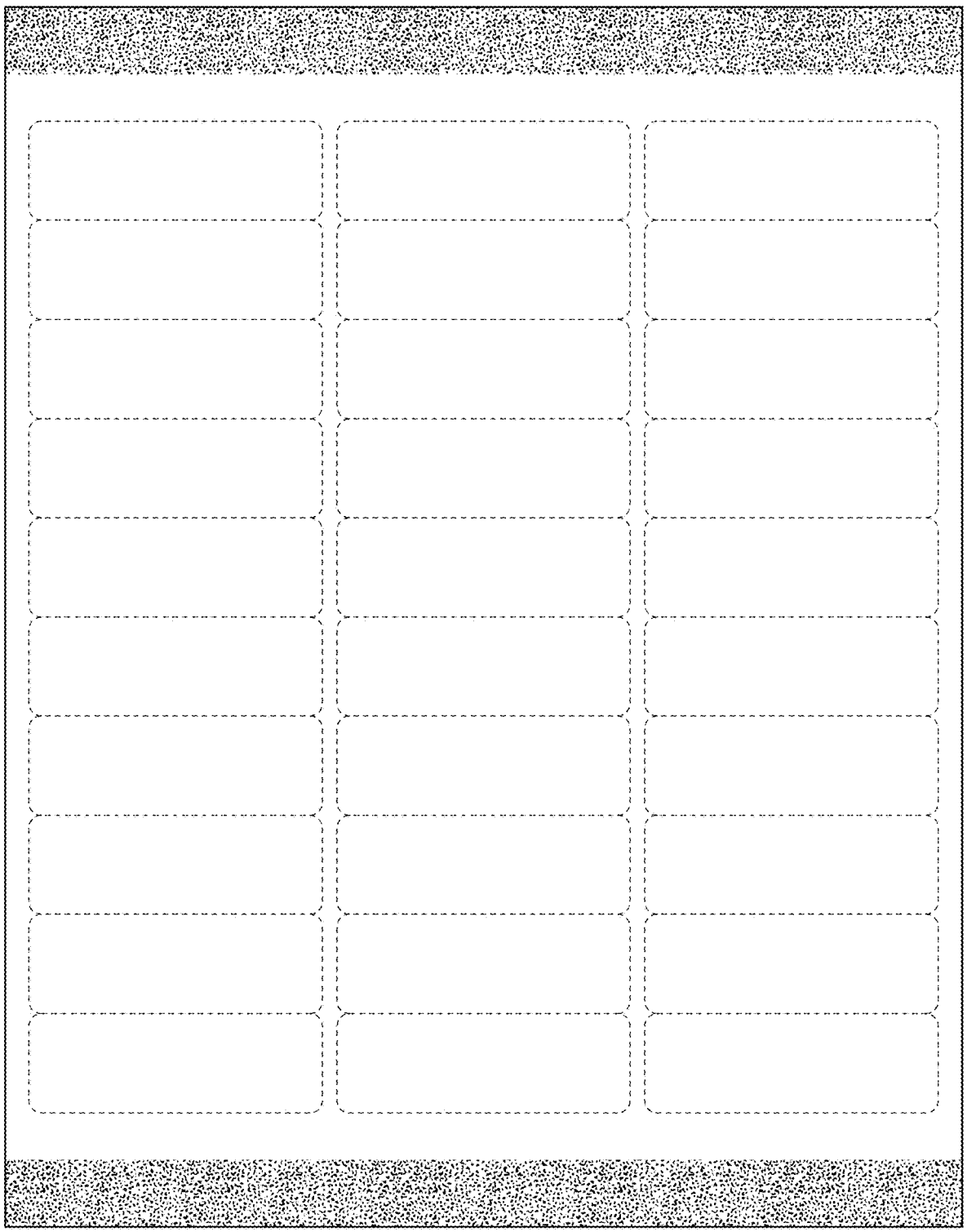
Figure 33:
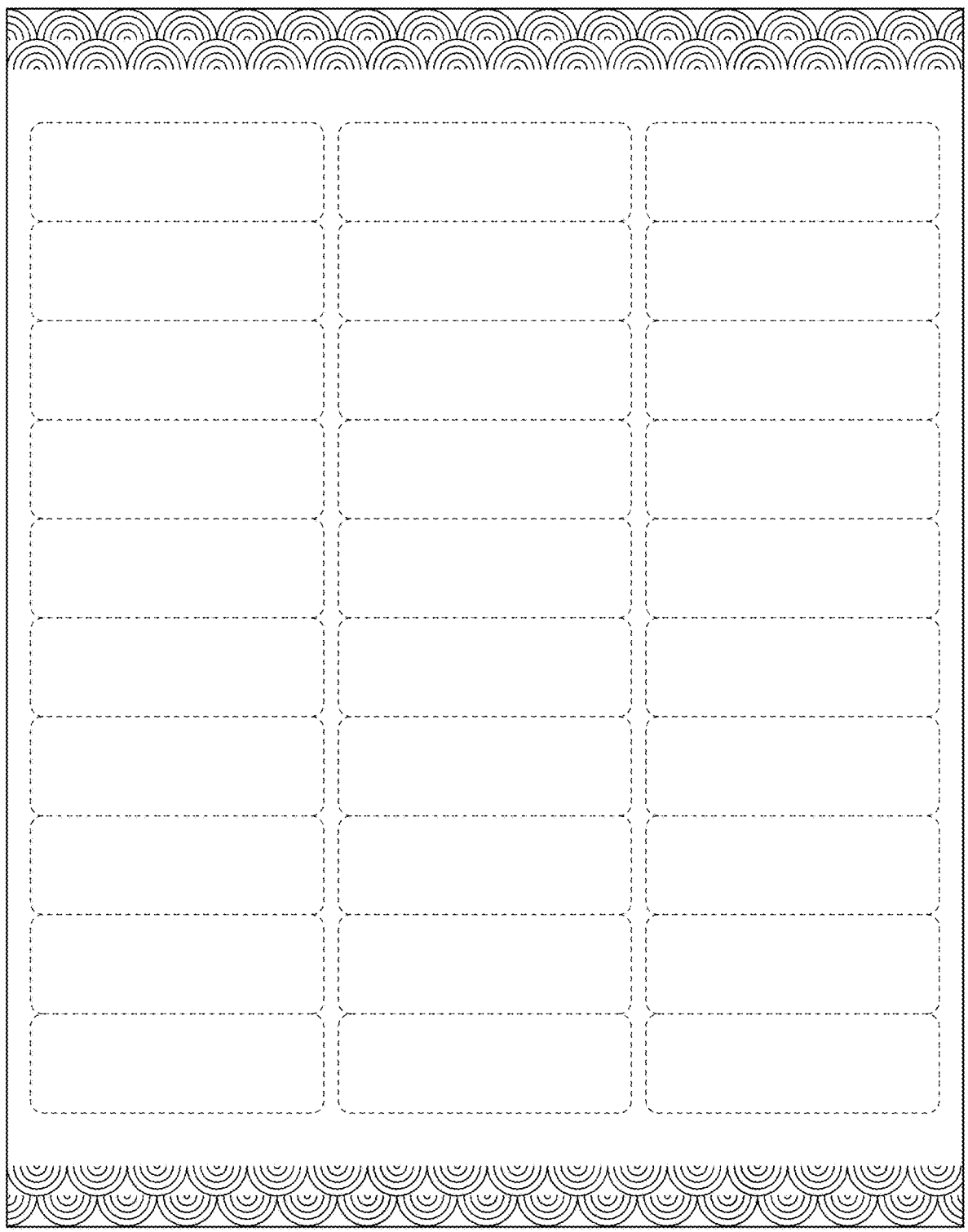
Figure 34:
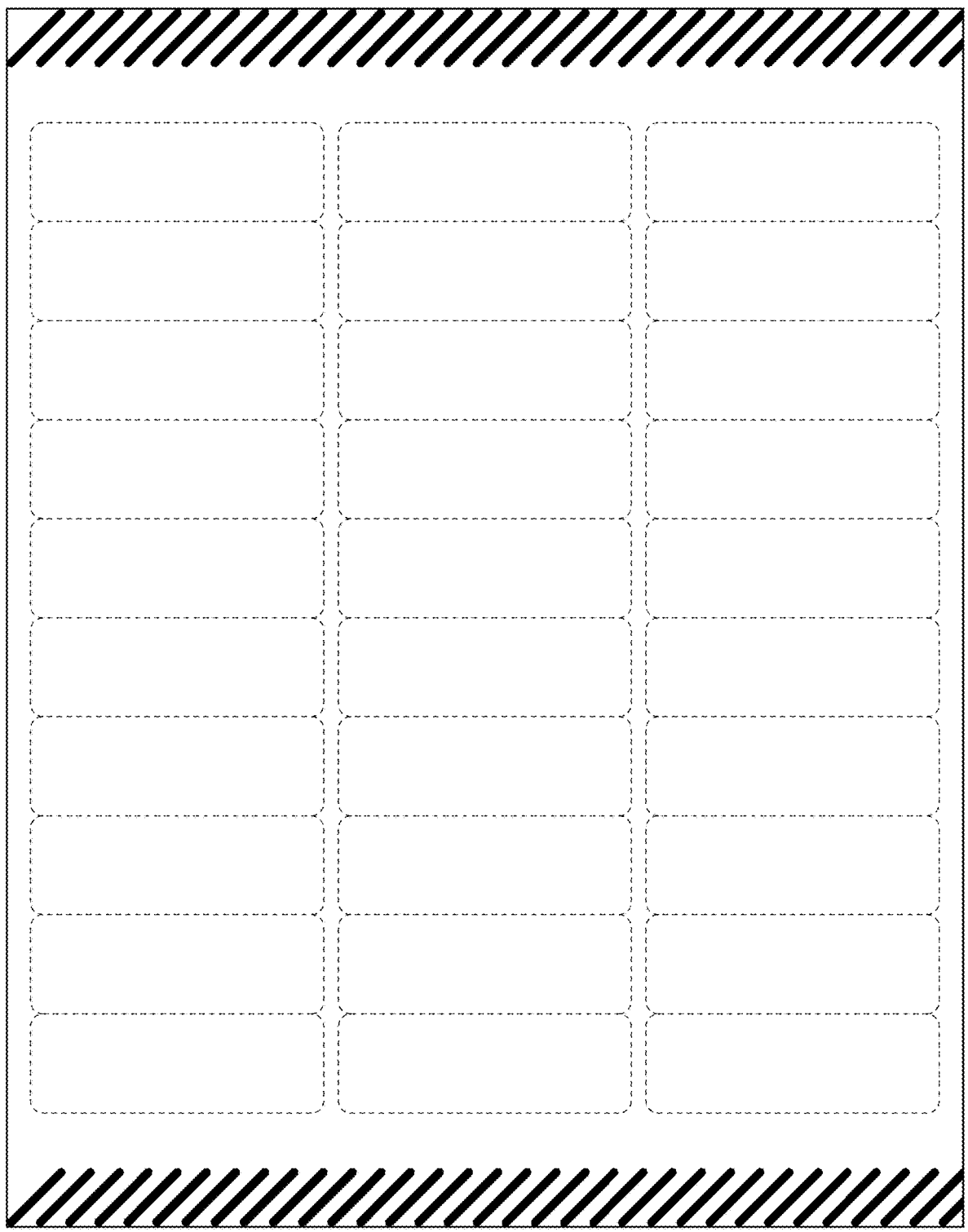
Figure 35:
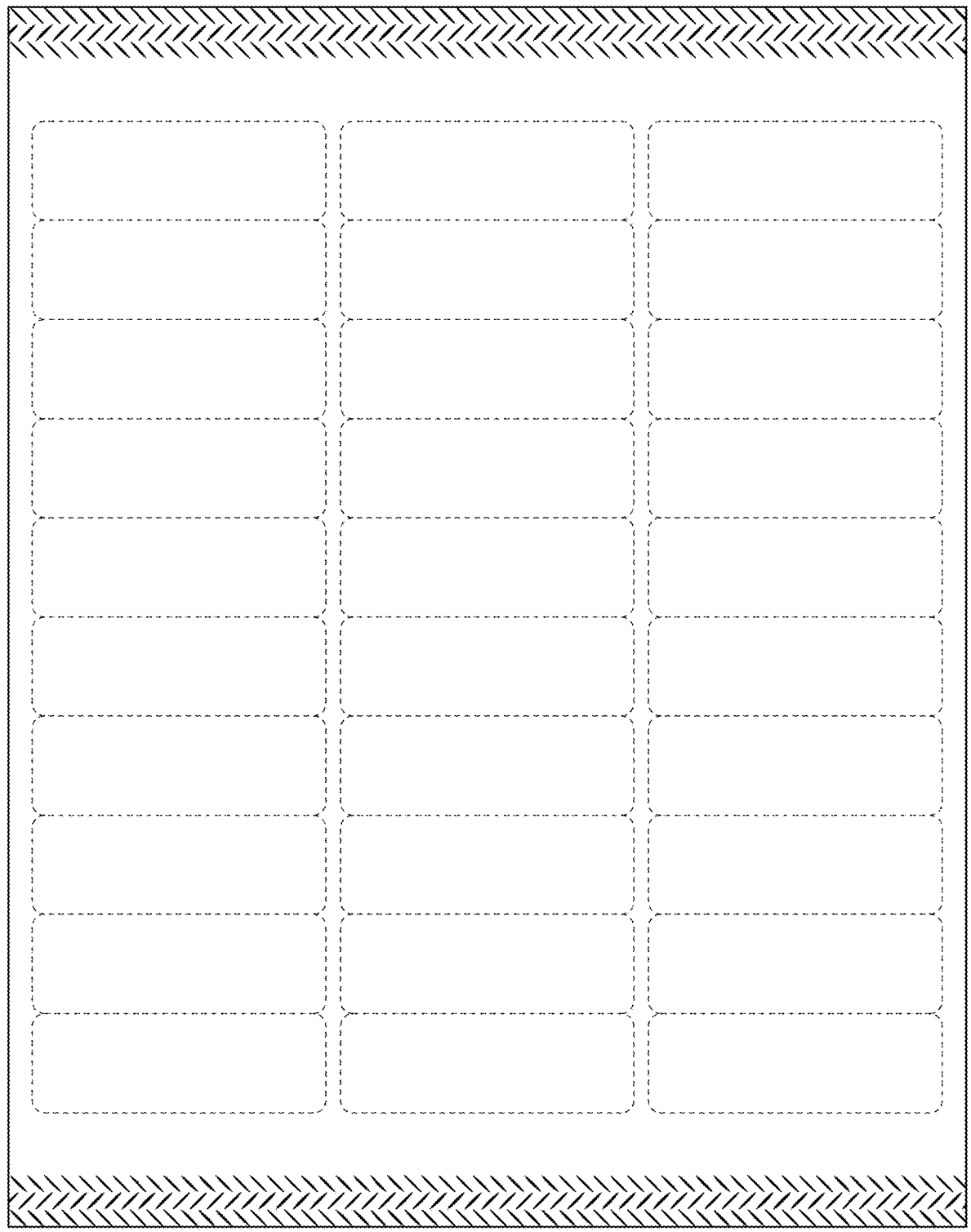
Figure 36:
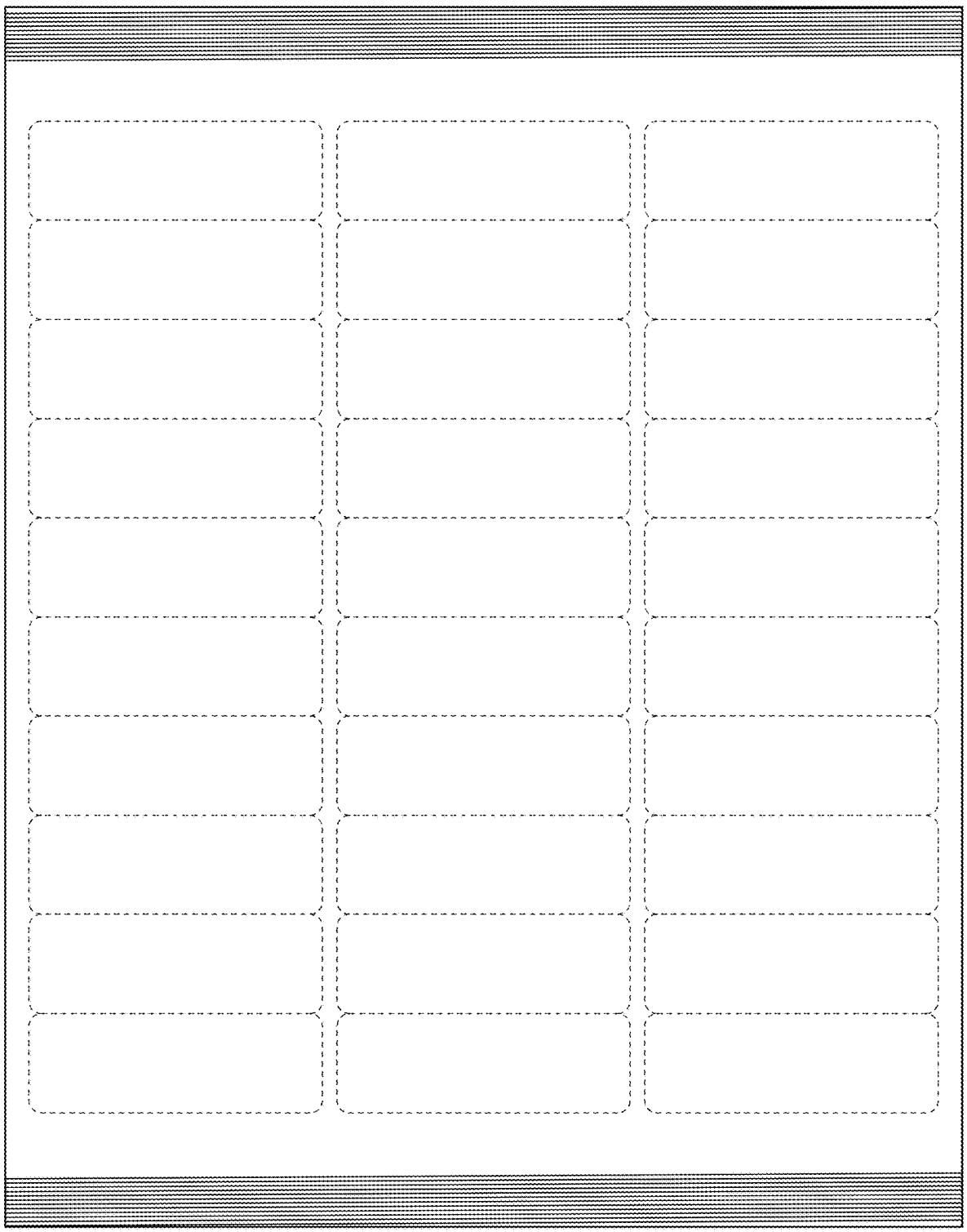
Figure 37:
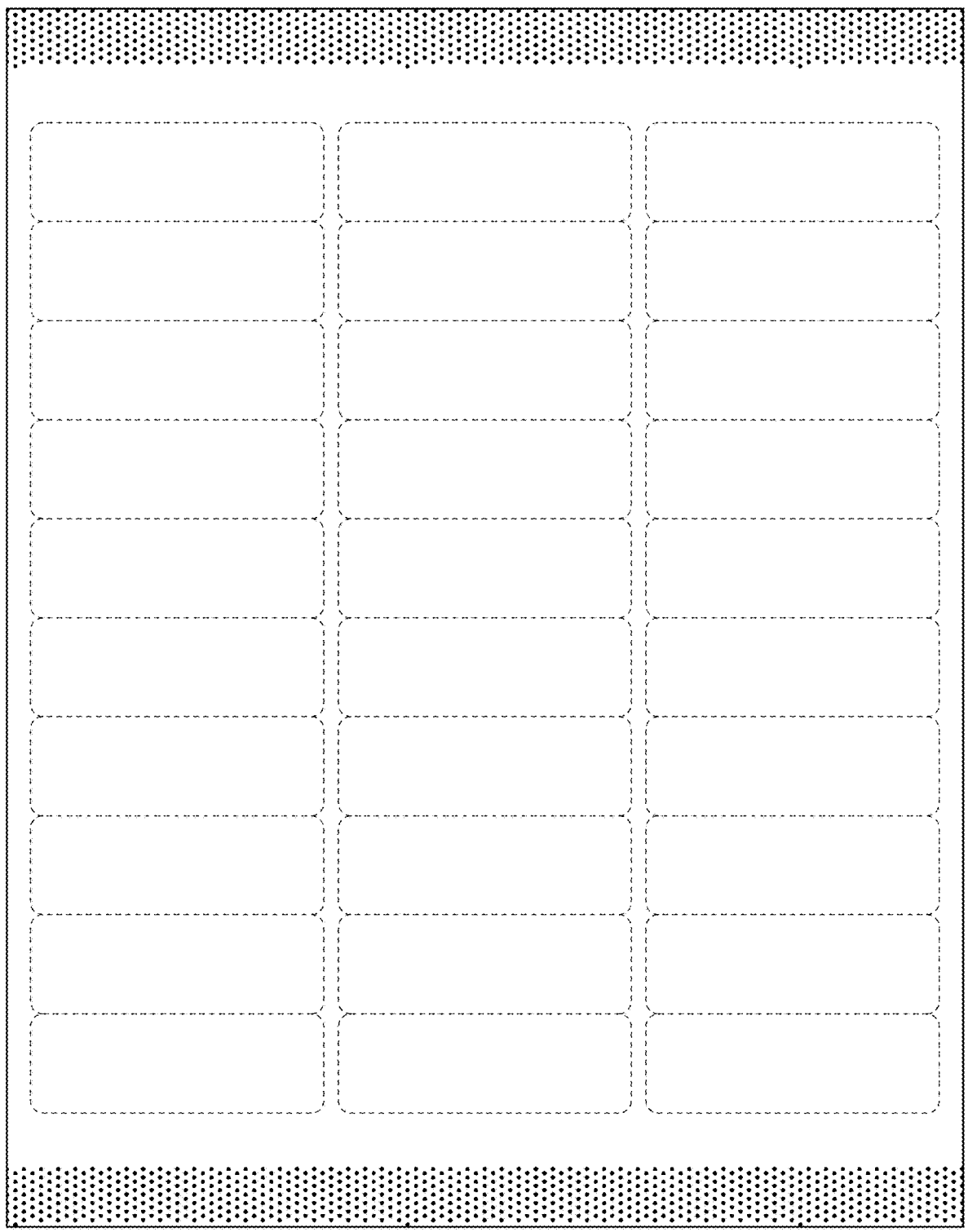
Figure 38:
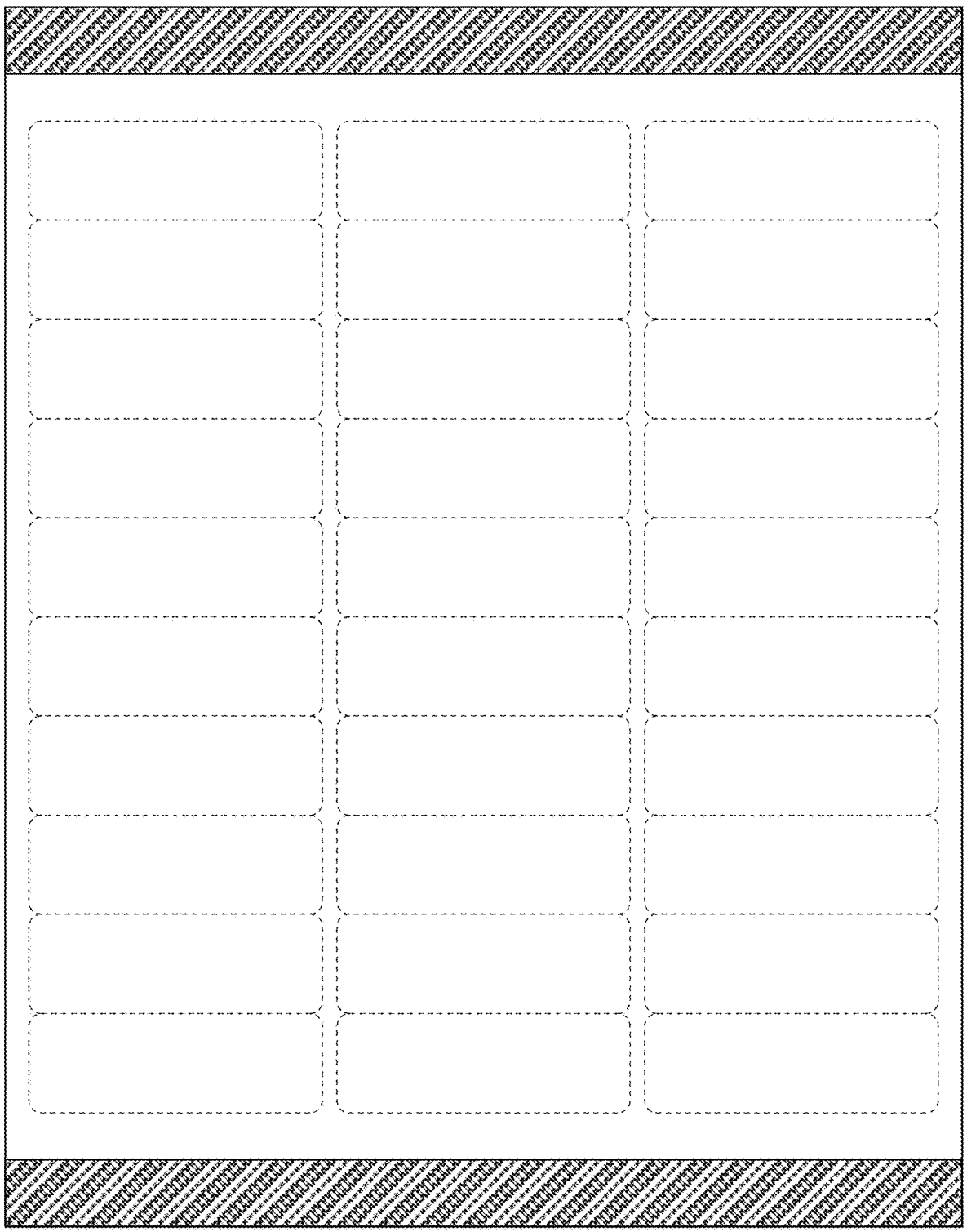
Figure 39:
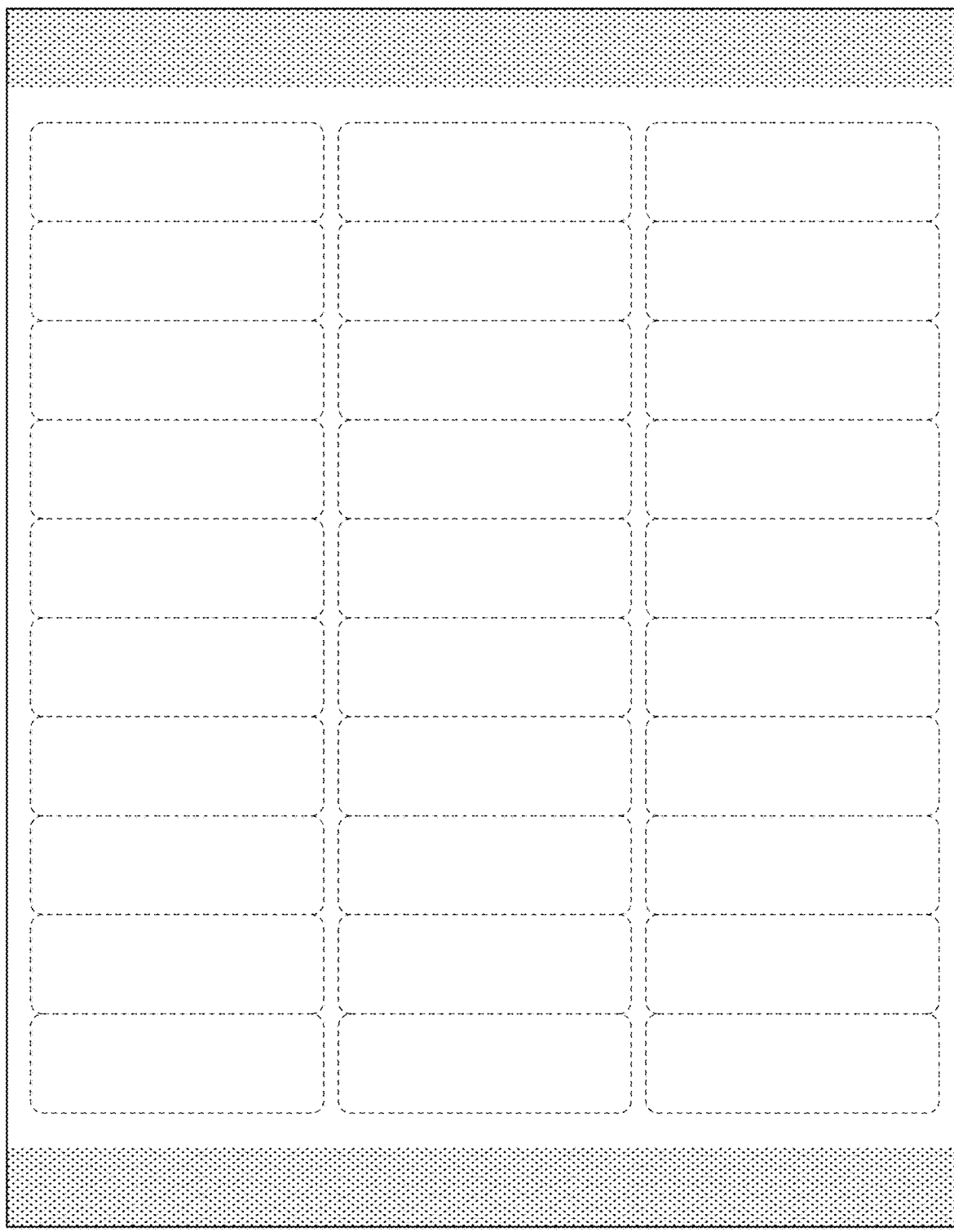
Figure 40:
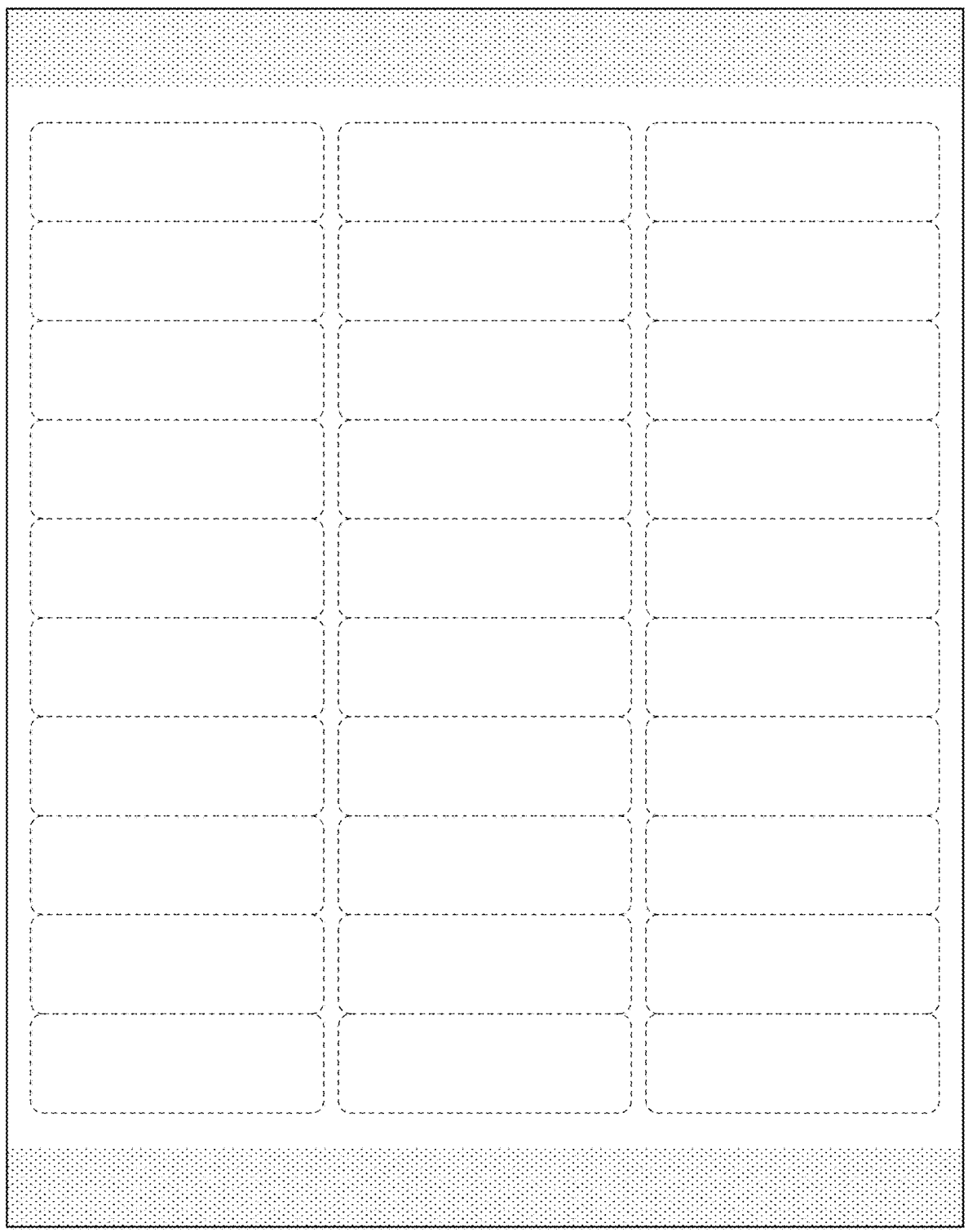
Figure 41:
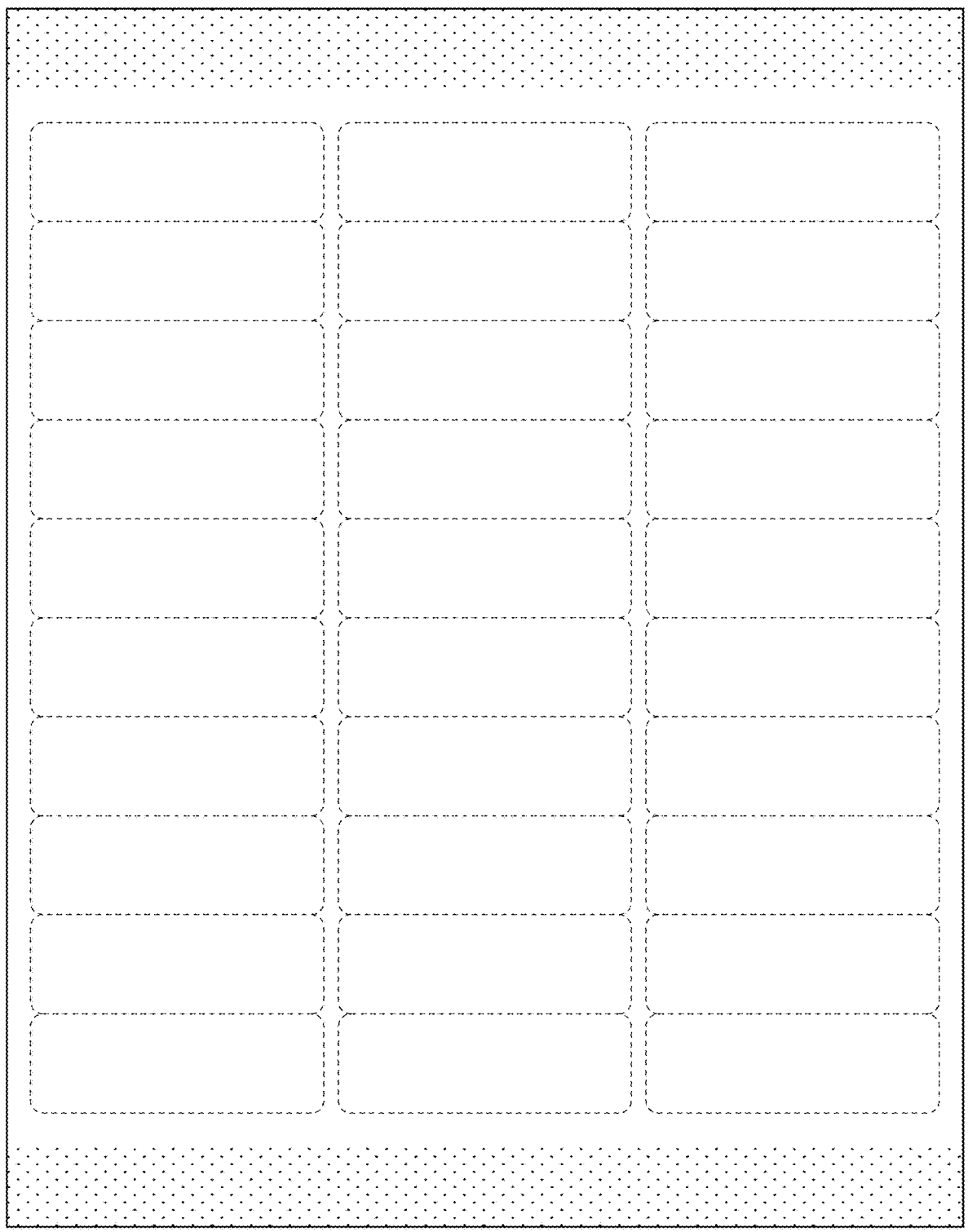
Figure 42:
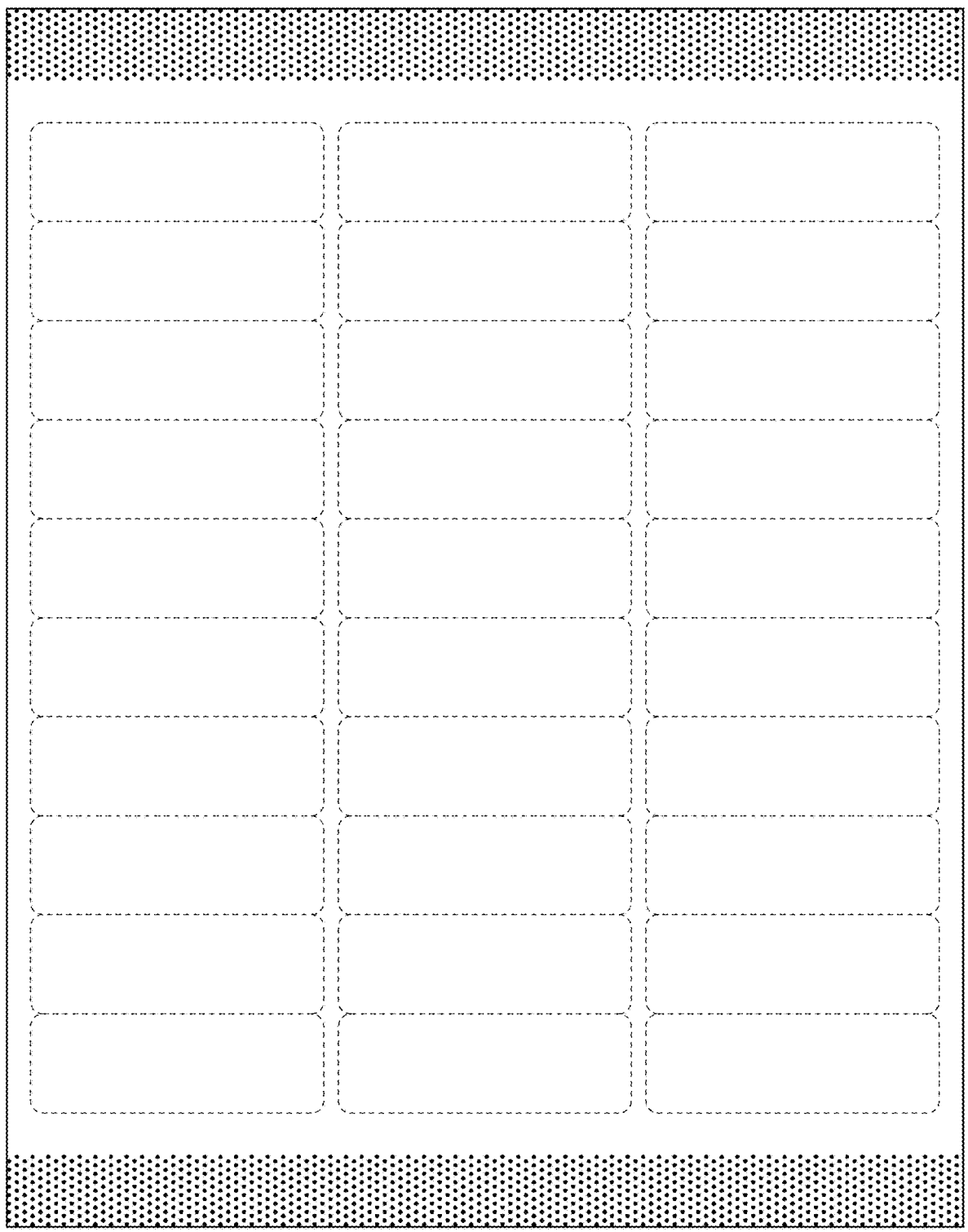
Figure 43:
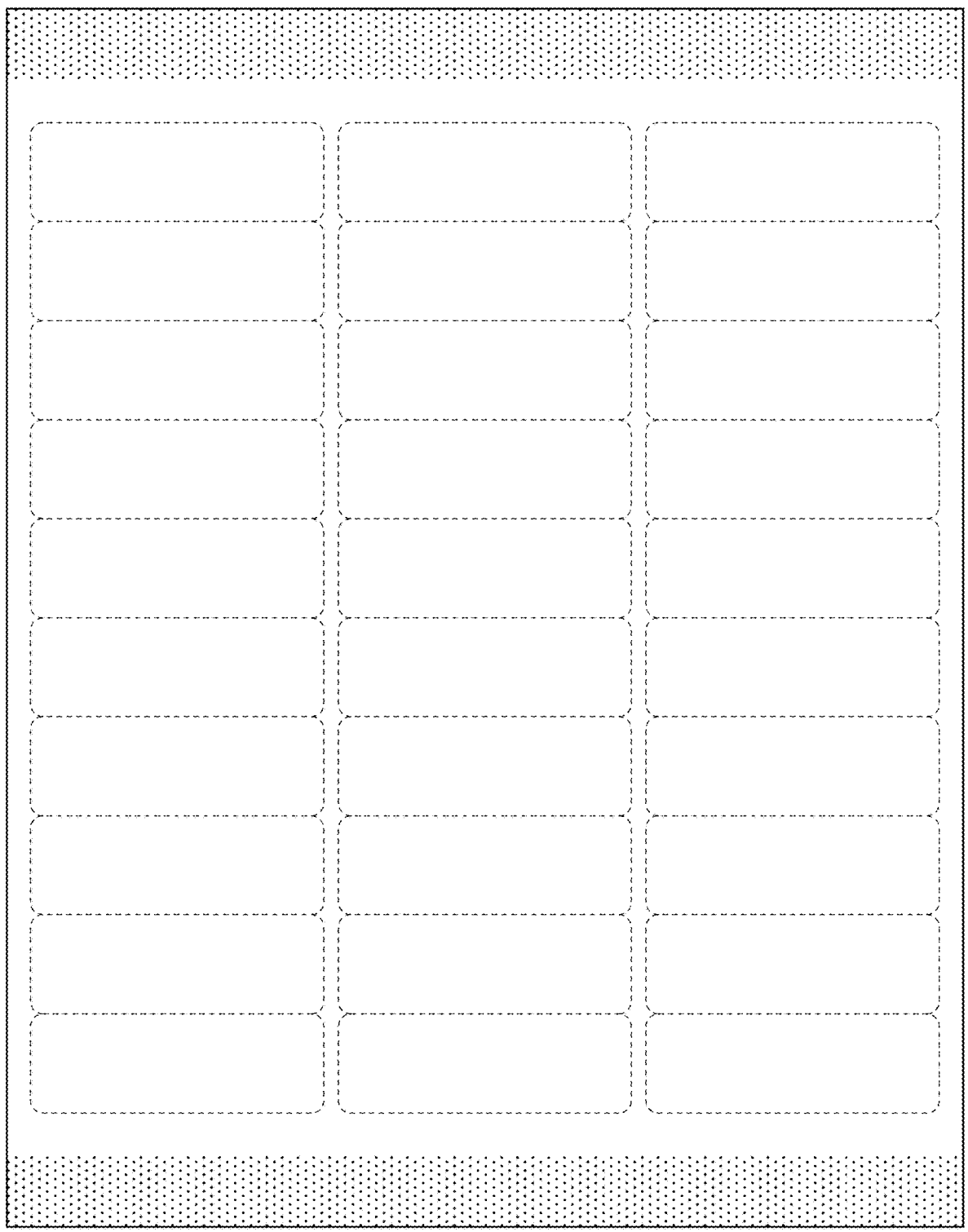
Figure 44:
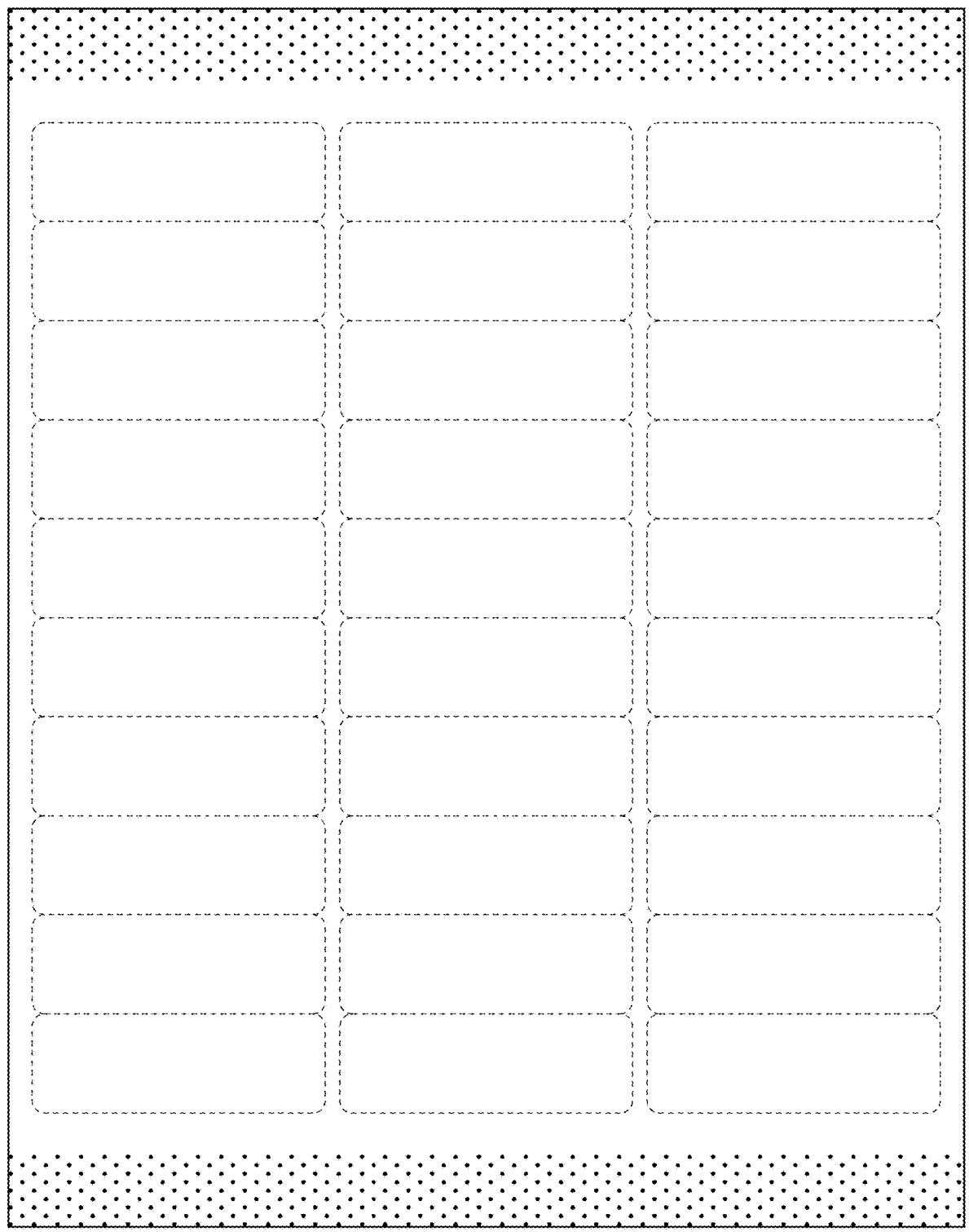
Figure 45:
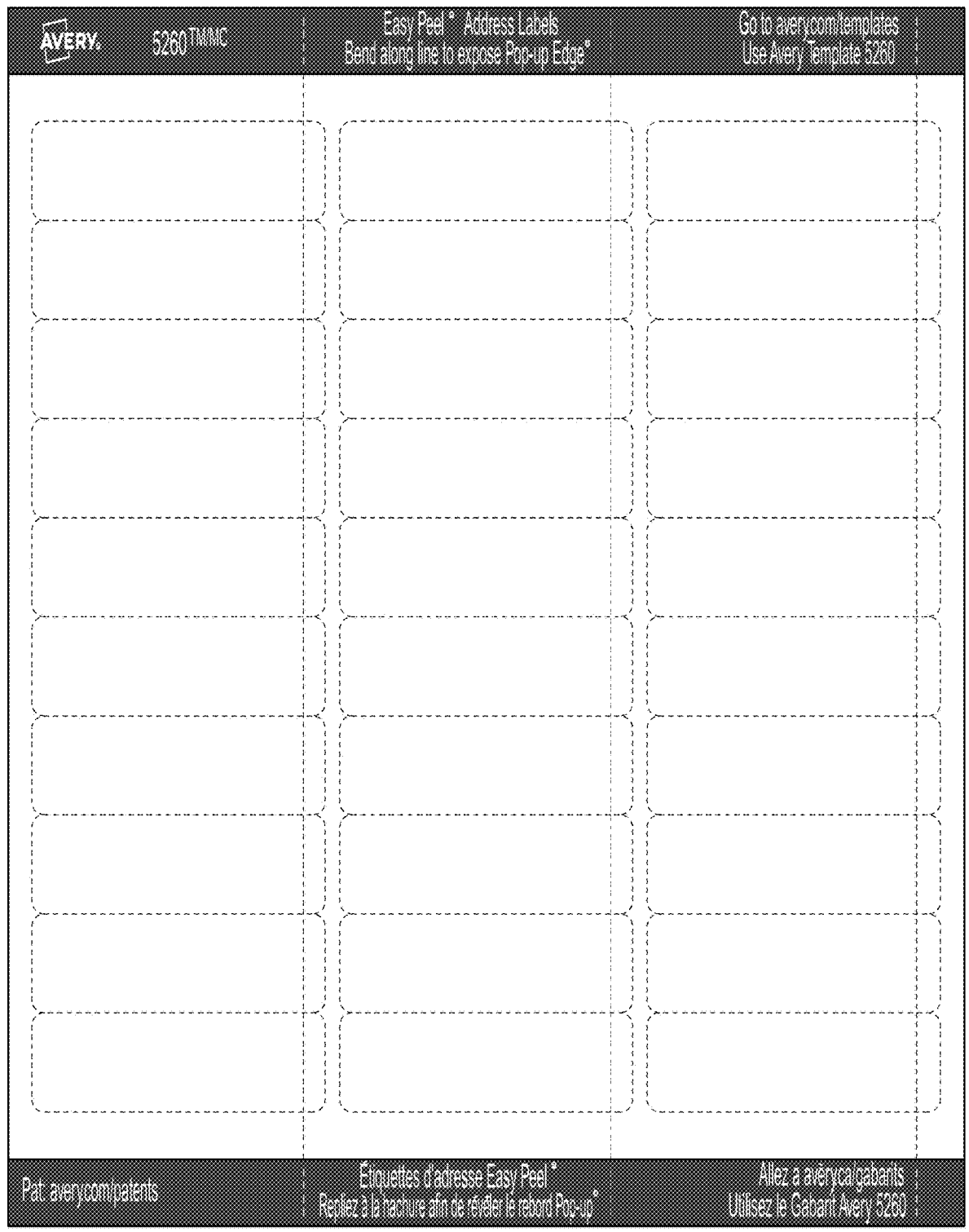
Figure 46:
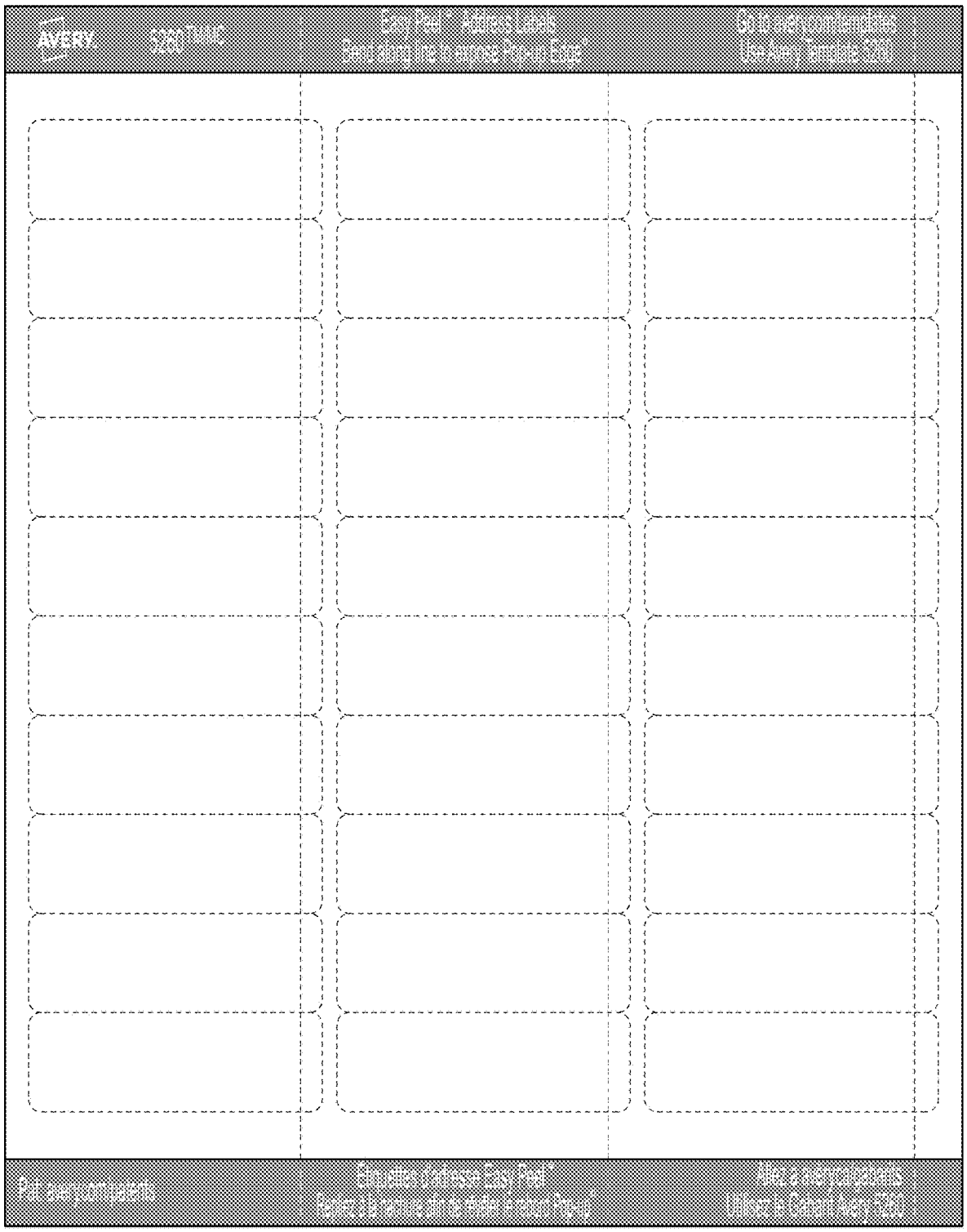
Figure 47:
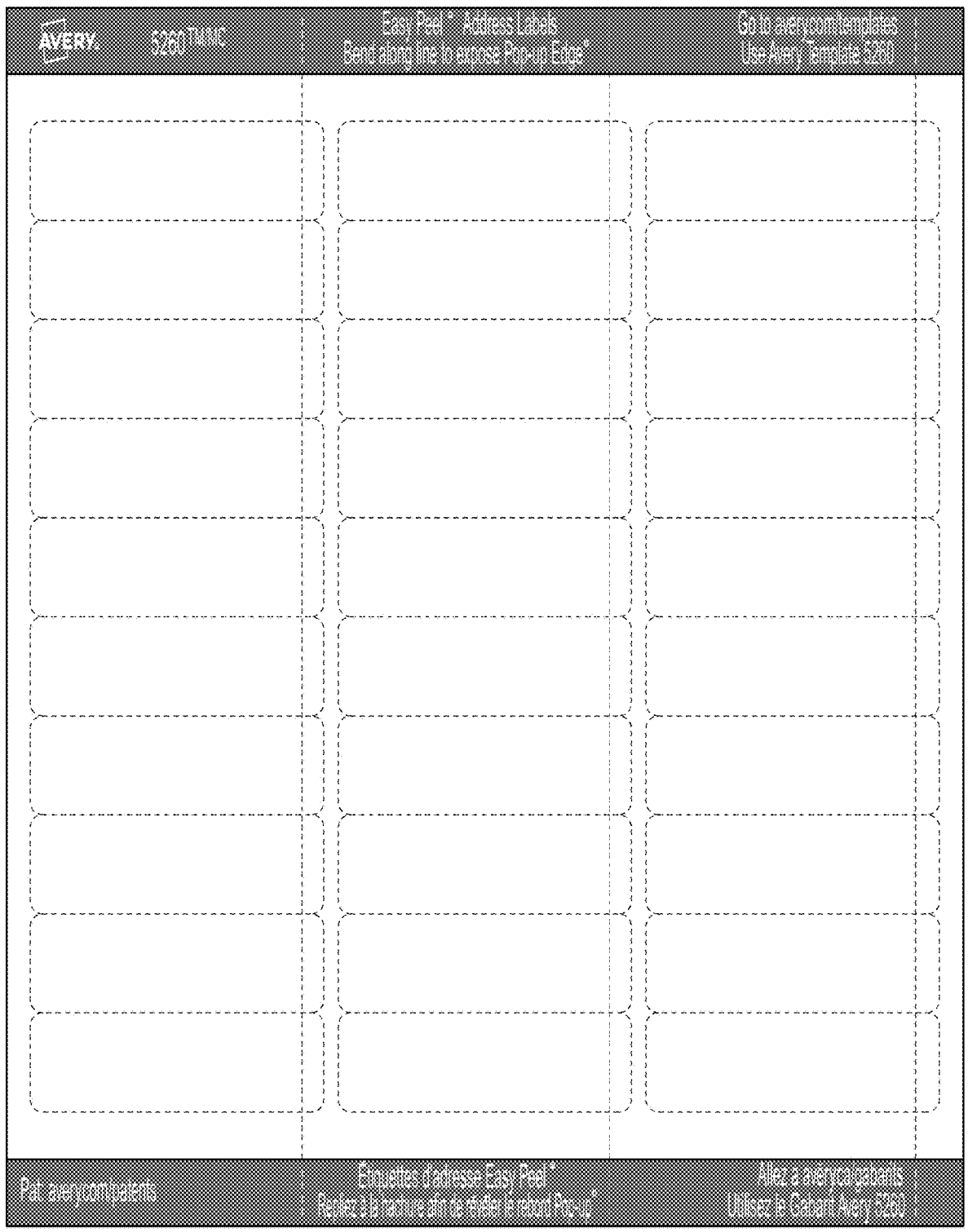
Figure 48:
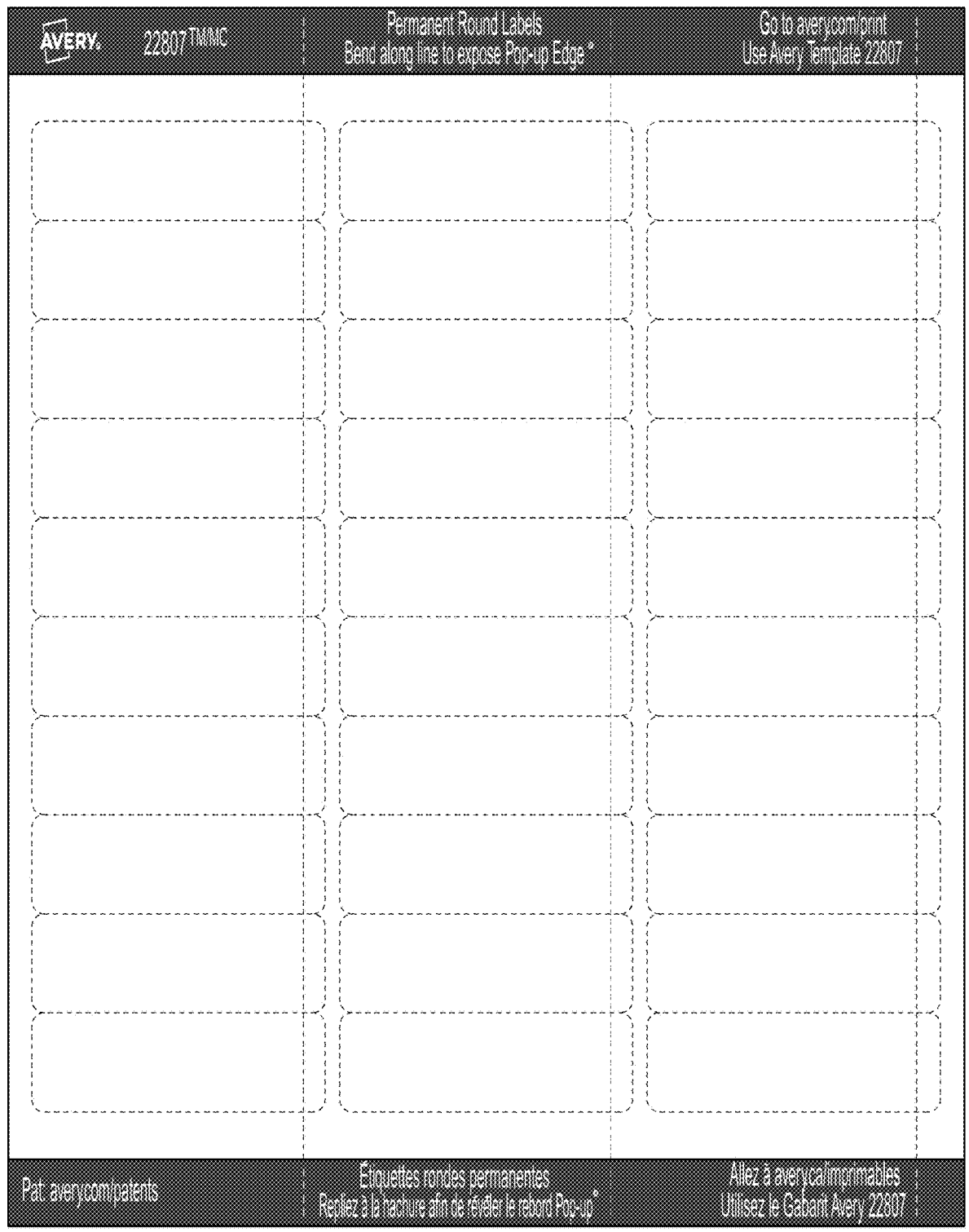
Figure 49:
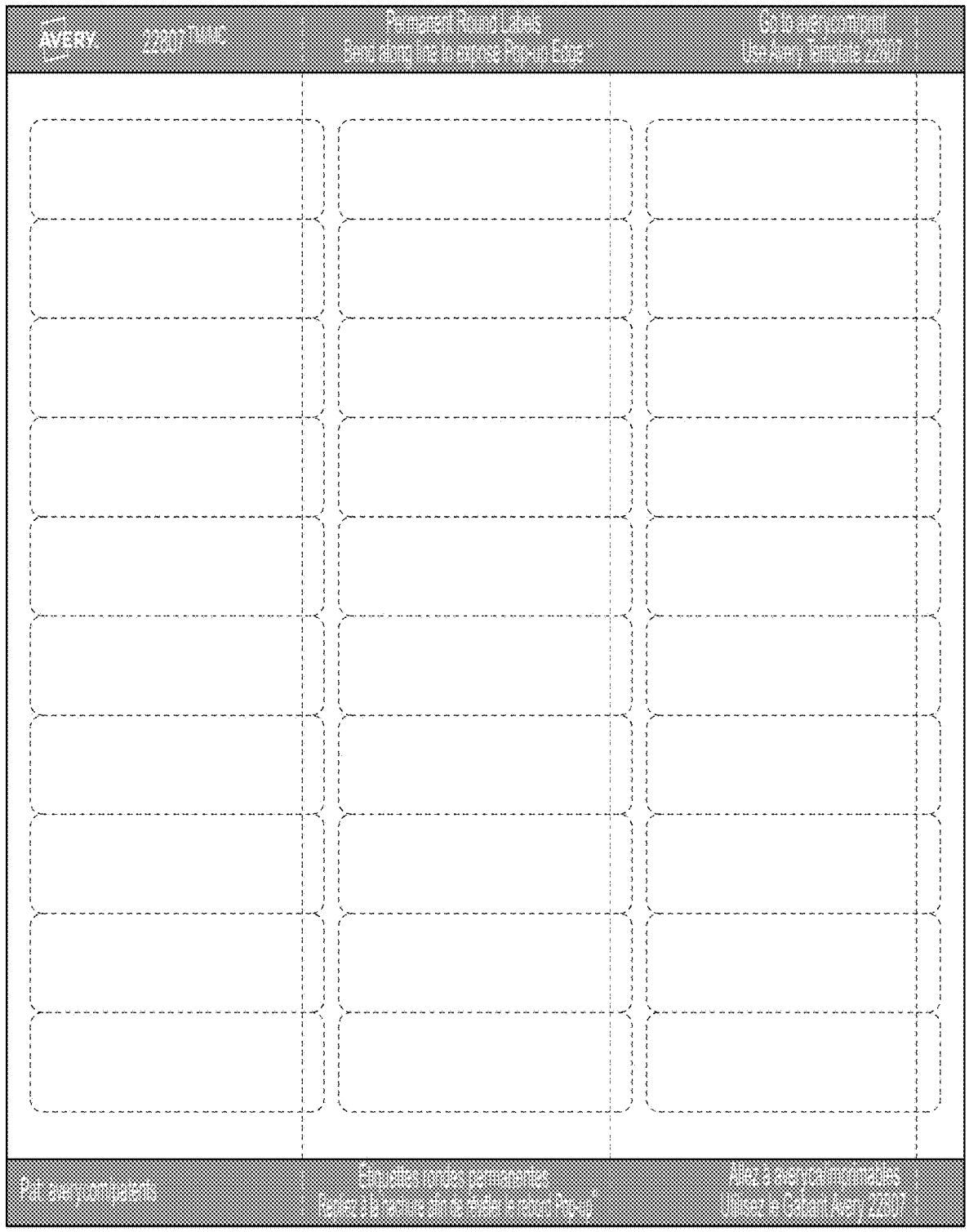
Figure 50:
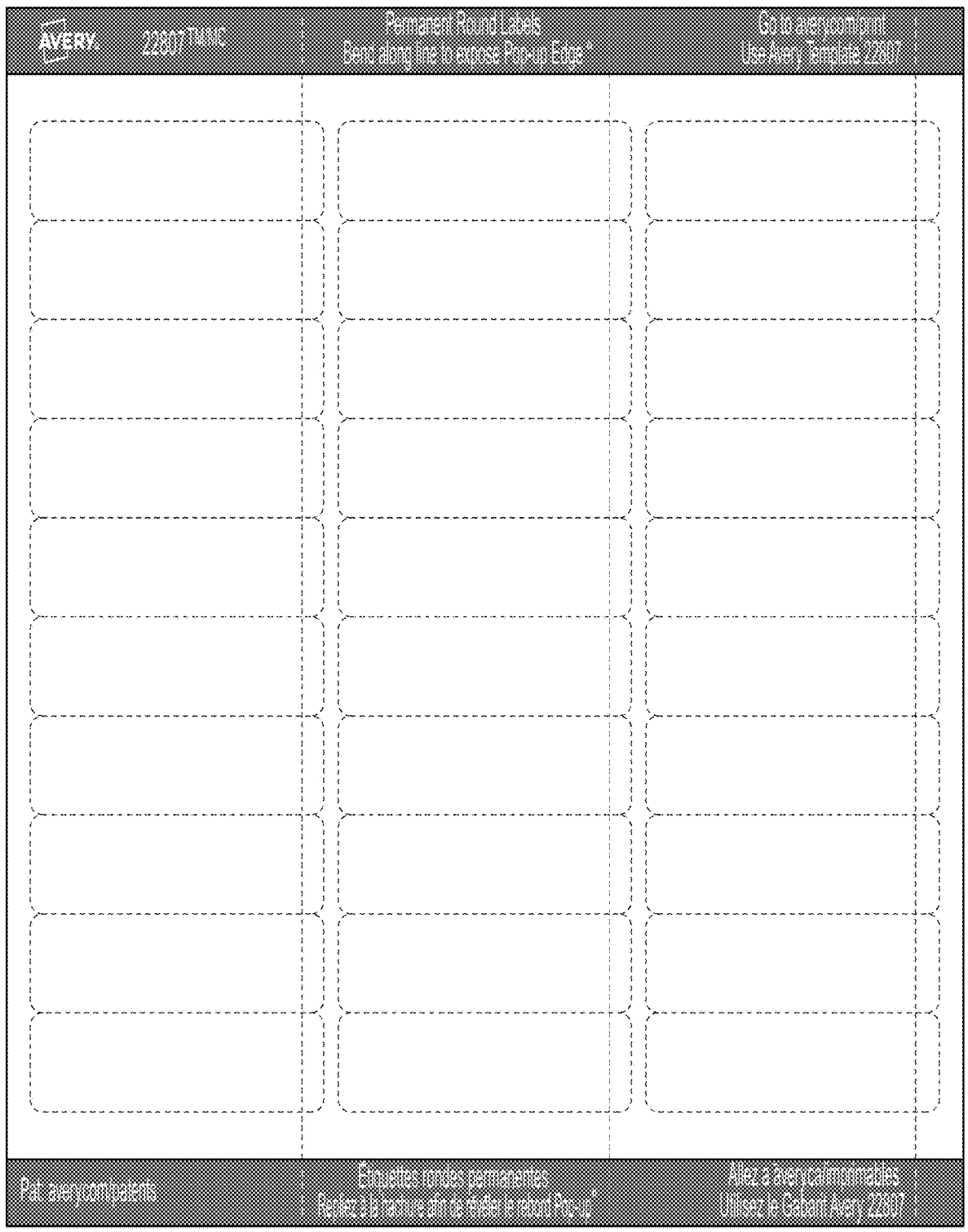
Figure 51:
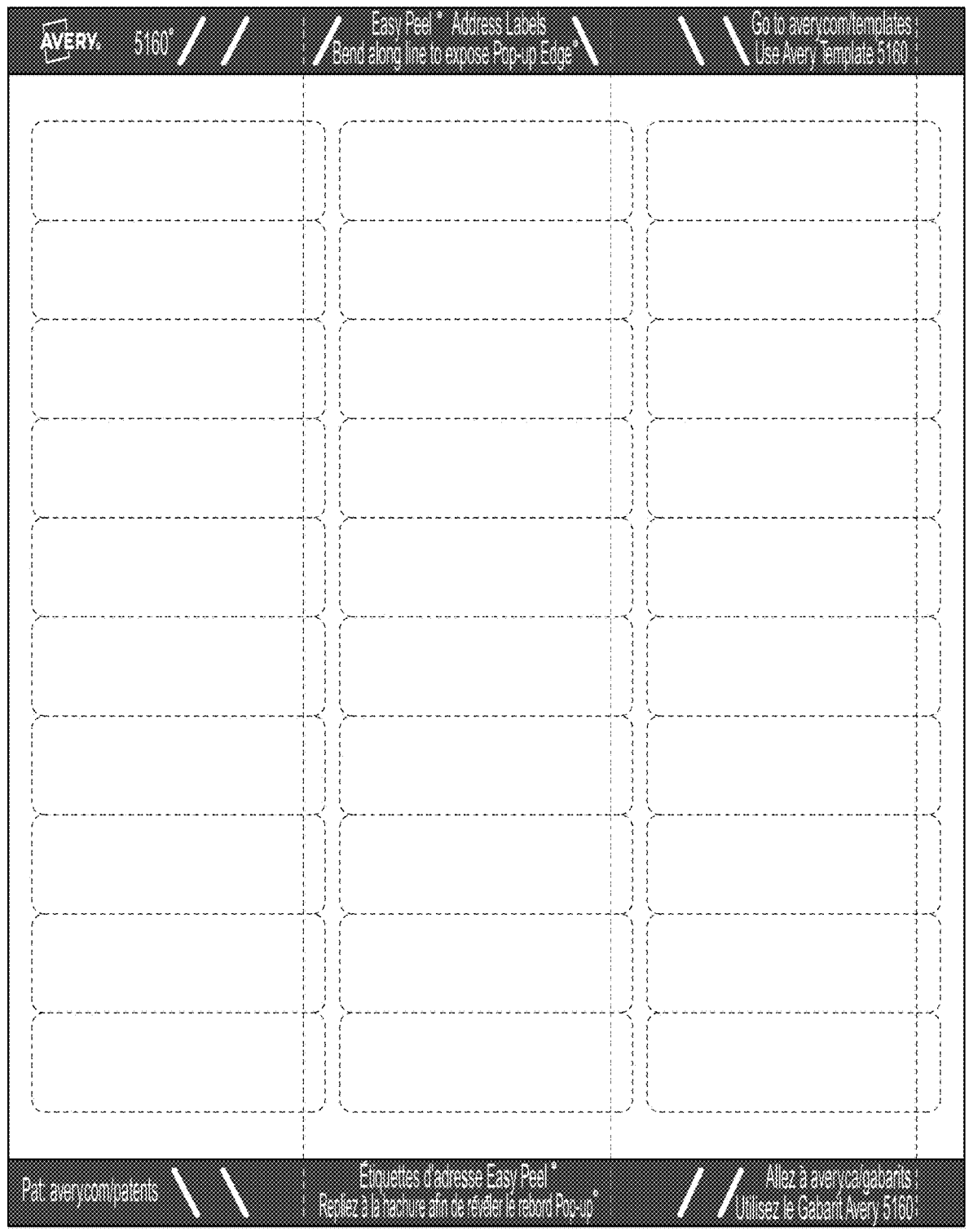
Figure 52:
Figure 53:

FIGS. 21-53 illustrate embodiments of the label sheet assembly 10 having various different configurations of surface features 80, 90 along the header portion 120 and footer portion 130 of a front portion thereon. These surface features may be printed texture type or emboss texture type and may be a grip strip pattern of elevated elements. In these embodiments, the patterns may include: rows of recessed arrows (FIG. 21) rows of recessed squares (FIG. 22), random recessed roughness (FIG. 23), rows of recessed scales or arches (FIG. 24), recessed thick diagonal lines (FIG. 25), rows of recessed opposing diagonal lines (FIG. 26), plurality of recessed horizontal grip strip lines (FIG. 27), rows of recessed dots (FIG. 28), recessed lines and angled patterns (FIG. 29), rows of arrows (FIG. 30), rows of squares (FIG. 31), random raised roughness (FIG. 32), rows of scales or arches (FIG. 33), thick diagonal lines (FIG. 34), rows of opposing diagonal lines (FIG. 35), plurality of horizontal grip strip lines (FIG. 36), rows of raised dots (FIG. 37), raised lines and angled patterns (FIG. 38), rows of small diamond dots (FIG. 39), rows of tiny diamond dots (FIG. 40), plurality of spaced small dots (FIG. 41), plurality of spaced round dots (FIG. 42), plurality of spaced tiny round dots (FIG. 43), plurality of spaced round dots (FIG. 44), blue colored printed texture with indicia (FIGS. 45 and 48), green colored printed texture with indicia (FIGS. 46 and 49), red colored printed texture with indicia (FIGS. 47 and 50), blue colored printed texture with diagonal lines and indicia (FIG. 51), an example of a back surface with blue printed texture with indicia (FIG. 52), and an example of a back surface with grey printed texture with indicia (FIG. 53). FIGS. 45-53 illustrate various embodiments of the label sheet assembly having various colors along the header and footer portions along with contrasting indicia. In particular, the colors identified include the following Pantone Matching System colors ("PMS"): Blue (PMS 286), Red (PMS 185), Green (PMS 368), and Gray (PMS Warm Gray 5). Notably, this disclosure contemplates that the label sheet assemblies of these colored embodiments may also include at least one of the surface features 80, 90 and at least one of the header/footer colors. Thus, the label sheet assembly may include a pairing of a raised surface feature with a solid color having a reverse color text (such as white).

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

What is claimed is:

1. A label sheet assembly comprising:
   a facestock layer having first and second sides, the facestock layer including at least one cut line that defines at least one label and a matrix portion wherein the facestock layer is configured to receive indicia thereon;
   an adhesive layer along the second side of the facestock layer;
   a liner sheet layer having top and bottom surfaces, the top surface attached to the adhesive layer along the facestock layer; and
   at least one raised surface feature along the bottom surface of the liner sheet layer that includes a printed texture formed into a pattern including a first vertical surface feature, a second vertical raised surface feature and a third vertical raised surface feature, wherein the first and second vertical surface features include a plurality of spaced areas with rounded outer edges, and wherein the third vertical surface feature includes a plurality of spaced areas having a generally arrow shape with rounded edges that are generally aligned with the plurality of spaced areas of the first and second vertical surface features, the third vertical surface features being disposed between the first and second vertical features and between an upper edge and lower edge of the sheet, wherein the vertical surface features are aligned along a process direction as the label sheet is to be processed through a printer.

2. The label sheet assembly according to claim 1, further comprising a first surface feature applied along a header portion of the first side of the facestock layer.

3. The label sheet assembly according to claim 2, further comprising a second surface feature applied along a footer portion of the first side of the facestock layer along an opposite edge of the first surface feature.

4. The label sheet assembly according to claim 3, wherein the first surface feature and the second surface feature includes a solid color with contrasting indicia.

5. The label sheet assembly according to claim 4, wherein the contracting indicia includes alignment features wherein the alignment features include at least one of a diagonal line and a straight line.

6. The label sheet assembly according to claim 1, wherein the at least one surface feature is a printed texture or an embossed texture.

7. The label sheet assembly according to claim 1, wherein the at least one surface feature includes alignment features wherein the alignment features include at least one of a diagonal line and a straight line relative to leading edges to visually assist a user to align the label sheet assembly with a printer.

8. The label sheet assembly according to claim 1, further comprising a first surface feature is positioned along a header portion on the bottom surface of the liner sheet layer.

9. The label sheet assembly according to claim 8, further comprising a second surface feature that is positioned along a footer portion on the bottom surface of the liner sheet layer.

10. The label sheet assembly according to claim 1, wherein the bottom side further includes at least one of a first surface feature, a second surface feature, a solid color header, and a solid color footer.

11. A label sheet assembly comprising:
    a facestock layer having first and second sides, the facestock layer including at least one cut line that defines at least one label and a matrix portion on the first side wherein the facestock layer is configured to receive indicia thereon;
    an adhesive layer along the second side;
    a liner sheet layer having top and bottom surfaces, the top surface attached to the adhesive layer along the facestock layer; and
    a first vertical, raised surface feature along the bottom surface of the liner sheet layer and adjacent a first side edge of the sheet, a second vertical, raised surface feature adjacent a second side edge of the sheet, and a third, raised vertical surface feature disposed radially inward of the first and second vertical surface features, wherein the first and second vertical surface features include a plurality of spaced areas with rounded outer edges, and wherein the third vertical surface feature includes a plurality of spaced areas having a generally arrow shape with rounded edges that are generally aligned with the plurality of spaced areas of the first and second vertical surface features, wherein the surface features are aligned between an upper edge and a lower edge of the sheet and along a process direction as the label sheet is to be processed through a printer and is configured to provide a zone of tactile sensitivity along the label sheet assembly.

12. The label sheet assembly according to claim 11, further comprising a first surface feature applied along a header portion of the first side of the facestock layer wherein the first surface feature may provide a zone of tactile sensitivity along the label sheet assembly.

13. The label sheet assembly according to claim 11, further comprising a second surface feature applied along a footer portion opposite of the first side of the facestock layer along an opposite edge of the first surface feature.

14. The label sheet assembly according to claim 11, wherein the at least one surface feature is a printed texture.

15. The label sheet assembly according to claim 11, wherein the at least one surface feature includes alignment features wherein the alignment features include at least one of a diagonal line and a straight line.

16. The label sheet of claim 11, wherein at least one of the first, second, and/or third vertical, raised surface features located on the bottom surface of the liner sheet is disposed in a region corresponding to a region of the facestock layer having one of the at least one labels.

* * * * *